US006230930B1

(12) United States Patent
Sorensen et al.

(10) Patent No.: US 6,230,930 B1
(45) Date of Patent: May 15, 2001

(54) APPARATUS AND METHOD FOR VENDING PRODUCTS

(75) Inventors: Steven W. Sorensen, Maplewood; James E. Skavnak, Minneapolis; Thomas F. Gotich, Eagan; Scott Hudis, Stillwater; Joseph A. Lotspeich, West St. Paul, all of MN (US)

(73) Assignee: Cross-Given Manufacturing Company, St. Paul, MN (US)

(*) Notice: Subject to any disclaimer, the term of this patent is extended or adjusted under 35 U.S.C. 154(b) by 0 days.

(21) Appl. No.: 08/949,366

(22) Filed: Oct. 14, 1997

(51) Int. Cl.[7] .................................................. B65G 59/00

(52) U.S. Cl. .......................................... 221/131; 221/289

(58) Field of Search .................................. 221/241, 155, 221/289, 3, 2, 7, 15, 130, 131, 129, 192, 150 R, 88; 414/281, 277, 280, 13

(56) References Cited

U.S. PATENT DOCUMENTS

| | | | | |
|---|---|---|---|---|
| D. 362,463 | | 9/1995 | Vogelphol et al. | D20/4 |
| 2,302,166 | | 11/1942 | Anthony | 312/36 |
| 3,001,669 | | 9/1961 | Tandler et al. | 221/12 |
| 3,055,544 | | 9/1962 | Krakauer et al. | 221/14 |
| 3,370,749 | | 2/1968 | Nathan et al. | 221/293 |
| 3,810,561 | | 5/1974 | Merkl . | |
| 3,917,114 | | 11/1975 | Grosse | 221/251 |
| 4,108,333 | * | 8/1978 | Falk et al. | 221/13 |
| 4,405,059 | | 9/1983 | Kull | 221/129 |
| 4,483,459 | | 11/1984 | Taylor et al. . | |
| 4,560,088 | | 12/1985 | Tan | 221/75 |
| 4,687,119 | | 8/1987 | Juillet . | |
| 4,742,936 | | 5/1988 | Rein | 221/5 |
| 4,860,876 | | 8/1989 | Moore et al. | 194/205 |
| 4,903,815 | | 2/1990 | Hirschfeld et al. | 194/205 |

(List continued on next page.)

FOREIGN PATENT DOCUMENTS

| | | | | |
|---|---|---|---|---|
| 1 171 658 | | 6/1964 | (DE) . | |
| 36 05 921 A1 | | 8/1987 | (DE) . | |
| 0071438 | * | 7/1982 | (EP) . | |
| 0 071 438 A2 | | 2/1983 | (EP) . | |
| 071436 | * | 9/1983 | (EP) . | |
| 0551284 | | 7/1993 | (EP) | 221/301 |
| 2 152 020 | | 7/1985 | (GB) . | |
| 2 277 512 | | 11/1994 | (GB) . | |
| 646381 | | 9/1962 | (IT) | 221/301 |
| 62-14579 | | 1/1987 | (JP) . | |
| 3-118686 | | 10/1989 | (JP) . | |
| 3-154193 | | 11/1989 | (JP) . | |
| 4-195698 | | 7/1992 | (JP) | 221/298 |

(List continued on next page.)

OTHER PUBLICATIONS

The Beverage Industry is Changing!; 4 page brochure.
Introducing the Beveragemax Vending Machine From ECC. The Clear Choice. 1 page, 2 sided brochure.
F631 Frozen Merchandiser; FASTCORP; Ice Cream and frozen vendor; 1 page, 2 sided brochure.

*Primary Examiner*—Kenneth W. Noland
(74) *Attorney, Agent, or Firm*—Merchant & Gould P.C.

(57) ABSTRACT

An improved method and apparatus for vending products, and particularly beverage containers, of varied sizes, shapes and configurations without dropping or subjecting the vended product to damaging impact forces are disclosed. The products to be vended are aligned in selectable ordered queues within a vending machine that can include a transparent front panel. A robotic carriage assembly using rack and pinion assemblies moves in positive non-vibratory manner along an X-Y plane in the machine, captures the selected product from its queue and smoothly transports the product to a product delivery port conveniently located close to hip level. The carriage assembly uses unique product escapement and capture mechanisms to smoothly slide the related product from its queue into the carriage. Power door and safety lock features at the delivery port are also disclosed.

159 Claims, 16 Drawing Sheets

U.S. PATENT DOCUMENTS

| | | | | |
|---|---|---|---|---|
| 4,977,754 | | 12/1990 | Upton et al. | 62/248 |
| 4,986,441 | | 1/1991 | Kanbe et al. . | |
| 4,986,615 | * | 1/1991 | Hieb et al. | 221/241 |
| 4,995,498 | | 2/1991 | Menke | 194/205 |
| 5,028,766 | | 7/1991 | Shah | 235/381 |
| 5,036,472 | | 7/1991 | Buckley et al. | 364/479 |
| 5,121,854 | * | 6/1992 | Trouteaud et al. | 221/15 |
| 5,139,384 | | 8/1992 | Tuttobene | 414/281 |
| 5,143,193 | | 9/1992 | Geraci | 194/212 |
| 5,183,999 | | 2/1993 | Hakenewerth et al. | 235/379 |
| 5,206,814 | | 4/1993 | Cahlander et al. | 364/479 |
| 5,341,854 | | 8/1994 | Zezulka et al. | 141/1 |
| 5,385,265 | | 1/1995 | Schlamp | 221/7 |
| 5,415,417 | | 5/1995 | Reis, Jr. | 273/447 |
| 5,497,905 | | 3/1996 | Vogelpohl et al. | 221/226 |
| 5,505,332 | | 4/1996 | Vogelpohl et al. | 221/1 |
| 5,706,958 | * | 1/1998 | Spamer | 221/289 |

FOREIGN PATENT DOCUMENTS

| | | | |
|---|---|---|---|
| 5-197877 | 8/1993 | (JP) | 221/298 |
| 9-102066 | 4/1997 | (JP) . | |
| 9-319959 | 12/1997 | (JP) . | |
| 11213234A | 8/1999 | (JP) . | |
| WO 93/03462 | 2/1993 | (WO) | 221/301 |

* cited by examiner

APPARATUS AND METHOD FOR VENDING PRODUCTS

FIELD OF THE INVENTION

This invention relates generally to vending machines, and more particularly to an improved method and apparatus for vending multi-sized and fragile products and in particular bottled or canned beverages of varied sizes and shapes.

BACKGROUND OF THE INVENTION

This invention applies to the vending of products in general and in particular to the difficult issues that arise when attempting to dispense items of various sizes and shapes and/or fragile items that do not fare well when subjected to dropping or impact forces during a vend cycle. While the invention addresses all of these issues, the problems associated with dispensing bottled beverages of various sizes and configurations and packaged in various types of materials such as glass or plastic perhaps best characterize the situation. Accordingly, the invention will hereinafter be discussed in the context of its applicability to dispensing contained beverages, it being understood that the inventive principles can be expanded to include the dispensing of other products as well.

Machines for vending canned and/or bottled beverages have long been known. Early bottled vending machines enabled release of same-sized bottled beverages, one at a time, following deposit of the required purchase amount, from chest-like coolers. The purchaser was required for example to slide the neck of the beverage bottle along and through a retaining race to a dispensing location from which it could be lifted out of the refrigerated chest after release by the dispensing mechanism. With the advent of canned beverages, dispensing became somewhat simpler and easier to automate due to the standardization of container sizes and techniques that enabled the cylindrical cans to roll and drop through chutes during a vend cycle to the delivery area of the machine. Due in part to the rigidity of the cans and their secure seal mechanisms, and the fact that their movement can be fairly well controlled during a dispensing cycle, the canned beverage vending machine has become the standard of today's sealed beverage dispensing systems.

For the most part, the sale of specialty beverages such as fruit or fruit flavored juices, milk, teas and the like and/or beverages that were sealed in glass or plastic bottles, has been conducted by means of over-the-counter sale techniques and not through automated vending machines. For many of such specialty beverages, packaging in the standard disposable can configuration is not a viable option. For others, the marketing appeal and distinctiveness of a uniquely shaped or stylized container is of major concern. Non-can packaging has now even become popular for the well-known carbonated beverages, that are readily available in many different sized and shaped containers, both plastic and glass, and in various volumes.

It has also become desirable for vending machines to have glass doors through which the actual product being vended can be viewed by the purchaser. Such machines having helical vending coils (as for example illustrated in U.S. Pat. No. 4,061,245) for dispensing non-beverage packaged goods have become very popular with both customers and merchants. Refrigerated merchandising coolers for holding bottled beverages and having glass fronts have also been available in, for example, convenience stores, but have not generally been available for automatic dispensing of beverages. Some beverage dispensing machines have been configured such that their front doors hold actual samples of the beverages contained within the machine, but do not display the actual beverages to be dispensed.

Whether or not the vending machine has a glass front, automated vending has been a problem for most of the non-standard sized and non-canned beverage containers. To date, an automated vending machine that can reliably and safely vend beverage containers of different materials, sizes and shapes from the same machine, without damaging or dropping the container or product within has not been available.

One beverage vending machine that has attempted to address the need for a glass front beverage vending machine for bottled-type containers is illustrated in U.S. Pat. Nos. 5,505,332 and Des. 362,463. Such machine enables the purchaser to view and select the actual product to be vended, but operates on a principle that vertically drops the vended beverage container from the front end of the shelf on which it is stored, to a lower chute area that redirects the container to a delivery area from which the purchaser can remove the container. While addressing a number of industry needs, this vending technique is not usable or practical for vending many of the varied shaped and sized beverage containers available today, without the risk of damage to the container or contents. This is particularly true of larger glass bottles or thinner plastic containers that are susceptible to breakage or damage during a vertical drop vending process. In order to address such problems, larger and/or more damage susceptible containers, might be required to be placed on the lowermost shelves of the machine in order to minimize the vertical drop distance. Such requirement can impose significant marketing disadvantages to the merchandisers of such products who may wish to have their products displayed at a higher (e.g. eye level) position in the machine. Further, the impact imparted to the beverage container and its contents as a result of the vertical drop process can result in explosion or ruptured containers. At the very least, for carbonated beverages, the drop vend process requires the purchaser to wait for a period of time before opening the container in order to prevent explosive or overflow effervescence of the beverage upon opening. It is obvious that any breakage or product leakage or explosion within the vending machine can be very detrimental to the operability and reliability of the machine and can contribute to excessive maintenance problems.

Another disadvantage of machines such as that of the U.S. Pat. No. 5,505,332 patent, and virtually all vending machines that operate on the principle of dropping and delivering the vended product by gravity, is that the delivery bin or delivery port of the machine is necessarily located below the lowest shelf of the product storage area toward the lower portion of the machine. Such positioning requires the purchaser to bend down and often to reach in awkward manner, in order to retrieve the vended product from the delivery bin of the vending machine.

There have been designs of vending machines that use robotic principles to acquire a product to be vended from the machine. With the use of such robotic techniques, the product to be vended can be selected and removed from its stored position without dropping the product, and which can then be carried to a delivery area that is not required to be at the bottom of the machine. Examples of such machines as applied to the vending of like-sized video cassettes are illustrated by U.S. Pat. Nos. 5,036,472 and 5,139,384. Such systems, however, have not been particularly applicable to the dispensing of fragile products or of beverage containers of varied shapes. In general they have employed robotic mechanisms that are not practical for rapidly dispensing beverage, containers, and do not generally address the other problems of the prior art described above as related to dispensing bottled beverages.

The present invention addresses the described deficiencies of prior art vending machines and the need for a dispensing machine and method for dispensing fragile containers such as beverages packaged in glass, plastic or can containers of varied sizes, shapes and fluid volumes.

SUMMARY OF THE INVENTION

This invention provides an improved vending machine apparatus and method for vending products, and particularly bottled and canned beverages, without subjecting the vended containers to shock and impact forces due to dropping, rolling or abrupt tipping of the product during the vending operation. The invention uses an efficient, cost-effective, highly accurate, reliable and easily programmable robotic beverage capture assembly for capturing that beverage container selected by a customer from a plurality of viewable stored containers and for smoothly, gently, and quickly carrying the captured container to a product delivery area or port of the machine. The product delivery port is located at thigh to waist height to minimize customer bending while retrieving the vended product from the machine. The shelf or tray area of the machine preferably contains no active or powered components, but is entirely passive in nature, being operated entirely in response to activation forces applied thereto by the robotic beverage container capture apparatus. The vending machine and apparatus is extremely versatile and is particularly applicable to the vending of glass and plastic beverage containers of varied sizes, shapes and fluid volumes which can simultaneously be housed and dispensed by the vending machine. The glass door of the vending machine enables point-of-sale marketing of the products to be vended and allows the consumer to view the selected vended product during virtually the entire vend cycle. The smooth vending process minimizes product damage and stress and virtually eliminates machine maintenance caused by damage to or breakage of beverage containers during a vend cycle.

Thus according to one aspect of the invention there is provided a method for vending beverages packaged in sealed containers, comprising the steps of: (a) storing a plurality of packaged beverages and selectable queues of containers of such beverages within a vending machine; (b) aligning a robotic assembly in the machine in registration with a consumer selected one of said beverage container queues; (c) transferring one of the beverage containers from the selected container queue to the robotic assembly; (d) carrying the transferred beverage container to a delivery port of the vending machine; and (e) presenting the carried beverage container at the delivery port for customer removal from the vending machine; wherein the entire process is performed without dropping or subjecting the container to severe impact forces. The product queues can be arranged in vertically spaced columns within the vending machine which can be readily adjusted to accommodate beverage containers of varied heights. Further, the beverages can be arranged on shelves or trays that can be inclined at angles which permit gravity movement of the stored beverages in the queues toward a dispensing end of the queue. According to a preferred aspect of the invention, the customer selected beverage container is transferred from the selected container queue to the robotic assembly by simply sliding the first-in-line container from the selected queue into retaining engagement by the robotic assembly, while retaining the second-in-line and successively aligned ones of the beverage containers in that queue from moving along the queue.

According to yet another aspect of the invention there is provided a method of vending bottled beverages from a vending machine of the type having a transparent front viewing panel that enables customer viewing of the actual beverages held by the machine and available for vending, comprising the steps of: (a) aligning a plurality of bottled beverages in at least two ordered queues of the beverages; (b) providing a customer selection input identifiable with at least one of the two ordered queues of beverages; (c) removing a bottled beverage from said one of said ordered queues in response to said customer selection input; and (d) moving the removed bottled beverage to a delivery port of the machine, wherein the removing and moving steps are smoothly performed without dropping or subjecting the bottled beverage to sharp impact forces.

According to yet another aspect of the invention there is provided a method of vending discrete products from a vending machine of the type having a transparent viewing panel for customer viewing and selection of the products to be vended, and support means for supportably holding the products for visual presentation to a customer through the viewing panel, comprising the steps of: (a) ordering the products in a plurality of selectable queues of the products on the support means such that a foremost one of the products in each of the queues addresses the viewing panel at a dispensing end of its associated queue; (b) moving a capture assembly into alignment with a dispensing end of a customer selected one of the queues; (c) transferring the foremost one of the products from the customer selected one of the queues into retainment by the capture assembly; (d) moving the capture assembly with its retained product in view of the viewing panel to a delivery port; and (e) enabling customer removal of the retained product from the capture assembly at the delivery port; wherein the steps of transferring and moving the foremost product from the selected queue to the delivery port are performed without dropping or subjecting the foremost product to sharp impact forces.

According to yet a further aspect of the invention there is provided a vending machine for beverages packaged in sealed containers, comprising: (a) a storage facility defining an enclosed internal cavity and a container delivery port opening into the internal cavity; (b) container holding means within the internal cavity for holding a plurality of selectable sealed beverage containers, wherein the container holding means is disposed to define with the storage facility a vend selection space within the internal cavity; (c) beverage container capture means for retainably removing one of the plurality of selectable beverage containers from the container holding means in response to a vend control signal; (d) transport means operatively connected with the beverage container capture means for moving the beverage container capture means within the vend selection space in response to the vend control signal; and (e) control means operatively connected with the capture means and with the transport means for producing and providing the vend control signal thereto to cause the capture means and the transport means to cooperatively capture a selected beverage container from the container holding means and smoothly carry the captured container through the vend selection space to the delivery port without dropping or subjecting the selected beverage container to sharp impact forces. The invention further contemplates the use of a door forming a part of the chassis and including a transparent panel for enabling customer viewing of the plurality of selectable beverage containers in the chassis. The invention further contemplates the use of container release means operatively connected with at least one of the queues adjacent its discharge end for selectably retaining the beverage containers in the queue. The container release means preferably includes only passive components which do not require any external energy sources. The invention further includes a plurality of trays for aligning the containers in their respective queues. According to a further aspect of the invention, the transport means includes rack and pinion means for moving the beverage container capture means in the vend selection space in an accurate, positive and smooth manner, without vibration or wobble.

According to yet a further aspect of the invention there is provided a vending machine for vending selectable products comprising: (a) a product storage chassis including a door, cooperatively forming an internal cavity, wherein the chassis includes a transparent panel portion to enable viewing therethrough into the internal cavity and a product delivery port spaced from the transport parent panel portion; (b) product selection means operable by a customer for generating a vend control signal indicative a product selection of the customer; (c) support means operatively mounted within the internal cavity of the product storage chassis for supporting the products in a plurality of selectable and separate ordered queues of such products; and (d) a robotic assembly mounted to the chassis and operatively moveable within the internal cavity in response to the vend control signal to rapidly and smoothly remove and carry a selected product from its associated ordered queue to the product delivery port, without dropping or jarring the selected product; wherein a customer can view the entire product removal and carrying operation of a vending cycle of the machine through the transparent panel portion. The invention further contemplates the positioning of the delivery port at a customer convenient height that does not require the customer to excessively bend to retrieve the vended product. According to a further aspect of the invention, a door and associated locking assembly are provided at the delivery port for preventing opening of the door unless a vended product is available at the delivery port, and for preventing movement of the robotic assembly whenever the door is enabled for opening. The invention further contemplates the use of a robotic assembly having an X-Y support frame mounted in the chassis; a shuttle moveably mounted to the support frame for movement therealong in an X-direction; a carriage assembly operatively connected to the shuttle for controlled movement therealong in a Y-direction; and a capture mechanism operatively mounted to the carriage assembly for removing and carrying the selected product from its associated ordered queue. According to a preferred embodiment of the invention, dc motors with output drive gears engaging rack members are used for energizing the robotic assembly.

According to a further aspect of the invention there is provided a carriage assembly for use with the vending machine of the type having: a chassis defining an internal cavity, a front door forming one side of the chassis; a product support assembly mounted in the chassis and configured to hold a plurality of products to be vended in separate ordered queues of the products, such that one end of the queues address a dispensing end of the product support assembly, wherein the volume between the dispensing ends of the product support assembly and the door define a vend selection space; wherein the carriage assembly comprises: (a) an X-rail assembly mounted to the chassis in generally horizontal orientation; (b) a Y-rail assembly mounted to the X-rail assembly in generally vertical orientation and configured for movement along the X-rail assembly; (c) an X-drive motor mounted for movement with the Y-rail assembly for controlling movement of the Y-rail assembly along the X-rail assembly; (d) a carriage mounted to the Y-rail assembly for movement therealong; (e) a Y-drive motor mounted for movement with the carriage for controlling movement of the carriage along the Y-rail assembly; and (f) wherein the carriage assembly is configured to accurately move, position and hold the carriage relative to the product support assembly within the vend selection space. According to a preferred configuration of the carriage assembly, the carriage can attain movement positioning and positional maintenance along the Y-rail assembly to within an accuracy of 1/32 inch and even to within an accuracy of 1/64 inch. Accurate positioning of the carriage assembly in both the X and Y-directions is achieved by position sensors.

According to yet a further aspect of the invention there is provided a product release and capture assembly for use in a vending machine of the type having: a chassis defining an internal cavity; a product support assembly mounted in the chassis and configured to hold a plurality of products to be vended in separate ordered queues of the products, said product support assembly being arranged and configured to define a dispensing end of the queues, wherein a vend selection space is defined in the internal cavity adjacent the dispensing ends of the queues; the product support assembly further including means for urging products in the queues to move toward the dispensing ends of the queues; a carriage; drive means connected to controllably move the carriage generally in an X-Y coordinate plane within the vend selection space into alignment with the dispensing end of a selected one of the product queues, wherein the product release and capture assembly comprises: (a) an escapement mechanism mounted to the product support assembly of the selected one of the product queues adjacent the dispensing end thereof, wherein the escapement mechanism comprises: (i) a first engagement member configured to selectively engage a first-in-line product at the dispensing end of the selected queue; (ii) a second engagement member configured to selectably engage a second-in-line product aligned in said queue immediately adjacent to and behind the first-in-line product; (iii) a connector operatively connecting the first and second engagement members for cooperative movement, wherein the connector is configured to move the first engagement member into engaging and disengaging positions relative to the first-in-line product while simultaneously respectively moving the second engagement member into disengaging and engaging positions relative to the second-in-line product; (iv) bias means operatively connected with the connector for normally moving the first engagement member into its engaging position; and (v) a force receiving surface operatively connected with the connector for receiving an activating force tending to move the connector against the normal bias of the bias means; and (b) a capture receptacle movably mounted to the carriage for movement between first and second positions; the said capture receptacle when operable in said first position enabling free movement of the capture receptacle and the carriage relative to the escapement mechanism in the vend space; and being operable when moving to said second position, and when the carriage is positioned in operative alignment with a dispensing end of the selected queue, to engage the force receiving surface to operatively move the connector against the bias of the bias means, to move the first engagement member toward its disengaging position, thereby releasing the first-in-line product for movement out of the dispensing end of the queue and into the capture receptacle. According to yet a further aspect of the invention, the connector slidably engages the first engagement member and the connector and first engagement member are independently pivotally mounted for movement relative to one another. According to yet a further aspect of the invention, the first engagement member extends through a slot in the connector. According to yet a further aspect of the invention, the escapement mechanism includes only passive components requiring no power energy sources. According to yet a further aspect of the invention, the capture receptacle is pivotally mounted to the carriage about a generally horizontal pivot axis and pivotally moves thereabout to activate the escapement mechanism. The capture receptacle includes a floor portion for supporting one of the captured products from the queue and is configured such that its floor portion aligns with the queue floor portion during the vend procedure. The capture receptacle may also include retaining means in the floor and stabilizing means for maintaining the captured products in a stable position during its transport phase to the product delivery port.

These and other aspects of the invention will become more apparent upon a description of a preferred embodiment of the invention. It will be appreciated that the preferred embodiment is not to be construed as limiting the invention to any particular configurations, designs, or applications that are specifically presented therein. The preferred embodiment is presented to illustrate a specific application and implementation of the broader principles of the invention and is not to be construed in a limiting manner.

BRIEF DESCRIPTION OF THE DRAWING

Referring to the Drawing where like numerals represent like parts throughout the several views.

DETAILED DESCRIPTION OF THE INVENTION

Figure 1:
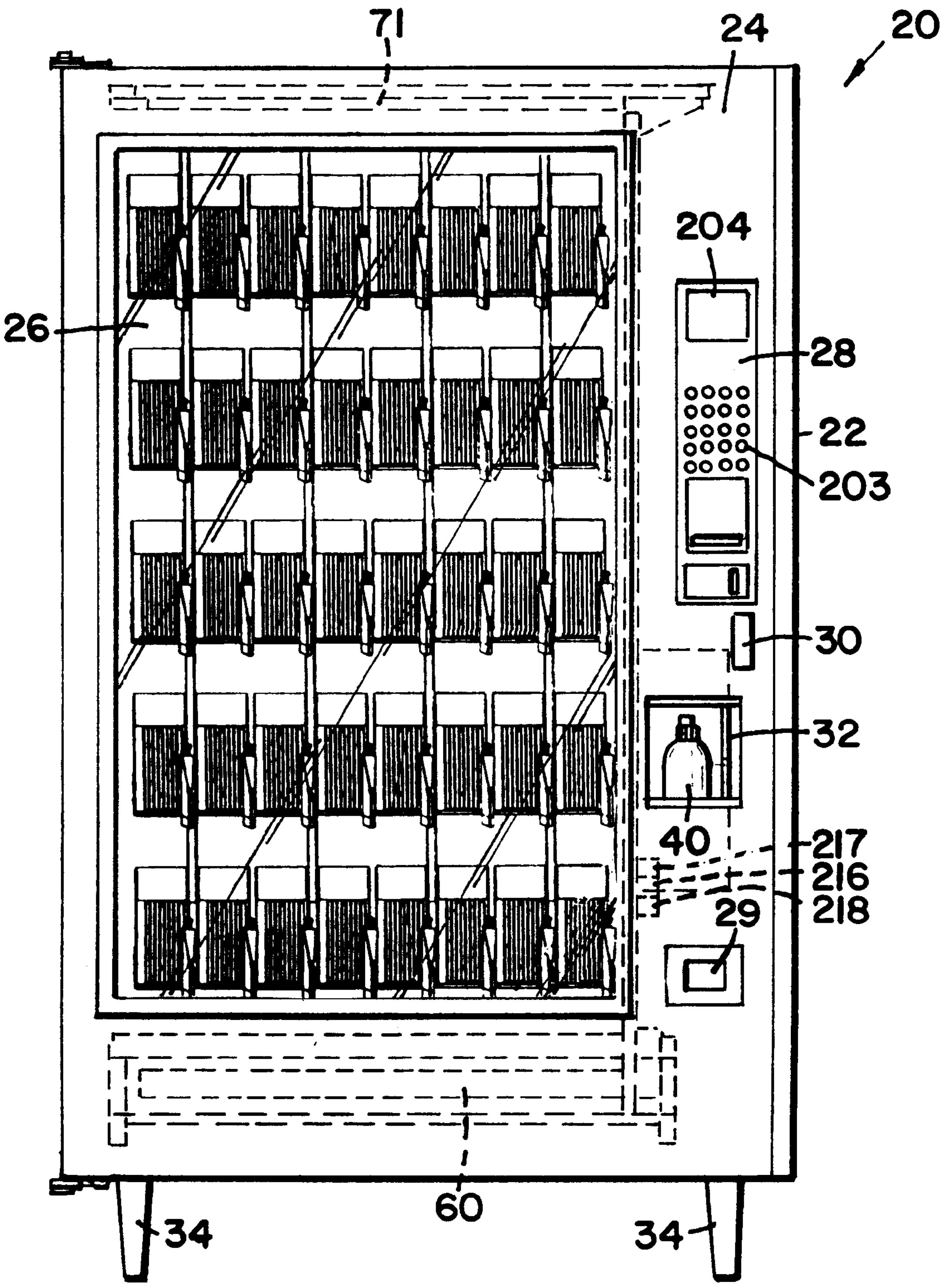
FIG. 1 is a front elevational view of a preferred embodiment of a beverage container vending machine incorporating the principles of the invention.

Referring to the figures there is generally illustrated therein a preferred embodiment of a vending machine that incorporates the principles of this invention. While the preferred embodiment of the invention will be described in association with its applicability to a vending machine for bottled and canned beverages, it will be understood that the broad principles of the invention are not limited to such product dispensing application or to the specifics of the preferred embodiment machine disclosed. The described machine represents one clear example of a dispensing system incorporating the principles of the claimed invention, but the invention is not intended to be construed in a limiting manner as a result of the preferred embodiment disclosure.

Referring to the figures, there is generally illustrated at 20 a vending machine for dispensing bottled and canned beverages of varied shapes, sizes, configurations and fluid volumes. The vending machine generally comprises an outer chassis or cabinet 22 and a front hinged door panel 24, which in combination define an inner cavity 25 for housing the products to be vended, the control and refrigeration functions of the machine and other vending machine features well-known in the art. The front door panel 24 frames a transparent glass or clear plastic panel 26 which provides a clear view into the internal cavity of the cabinet and the beverage products stored in ordered manner on trays therein, when the door panel 24 is closed. The door panel 24 includes an appropriate control panel, generally indicated at 28 which includes product selection input means and monetary and credit processing means, well-known in the art. Since the control panel and its various features and functions do not form a part of this invention, they will not be detailed herein. Those skilled in the art will readily recognize many appropriate such control panels and features thereof that could be used in association with a vending machine as hereinafter described. The door panel 24 illustrated in FIG. 1 also includes a coin return slot, generally indicated at 29 and a locking handle assembly 30 that enables the door to be opened and closed in secured manner for purposes of maintenance, loading of the machine, and the like. The door panel 24 also includes a product delivery port, generally indicated at 32, which is approximately at thigh or waist level and depicted with its door in an "open" position in FIG. 1, with a vended bottle product 40 illustrated through the open door. A more complete description of the product delivery assembly feature will be hereinafter described.

In the preferred embodiment, the chassis and door panel assembly is supported by a plurality of legs 34 in elevated manner above a floor or support surface to enable ease of cleaning below the machine, the ability to readily lift the machine by means of a pallet jack, fork lift or other moving type of structure and to provide improved ventilation for a refrigeration system (not illustrated, but well-known to those skilled in the art) for the vending machine. Since the vending machine of the preferred embodiment is configured to carry beverages, most of which require refrigeration, it is contemplated that the internal cavity (at least that portion thereof which is to contain the beverages to be dispensed) will be refrigerated by an appropriate refrigeration system. Such refrigerated portion of the machine may even be zoned for different temperatures to accommodate vendible products having different cooling needs. The upper product holding portion could also be partitioned into refrigerated and non-refrigerated compartments, into refrigerated and freezer compartments, or in other desired configurations.

Figure 4:
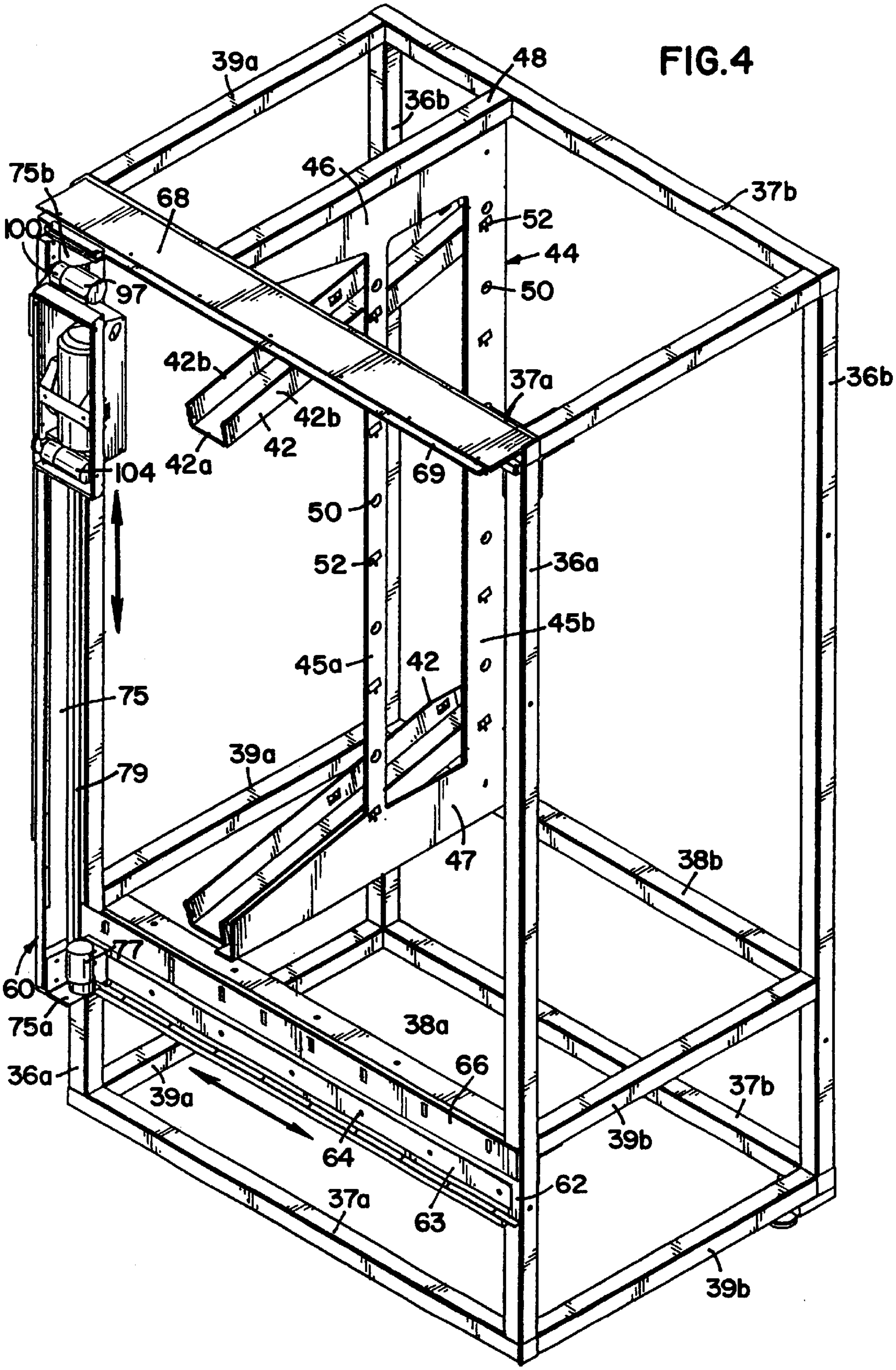
FIG. 4 is a top, right, front perspective view of the support frame structure of the vending machine of FIG. 1 with the outer chassis and door removed, illustrating the robotic beverage capture assembly attached thereto, and one vertical support beam of the beverage tray assembly of FIGS. 1 and 2.

The chassis or cabinet 22 of the vending machine is supported by an appropriate internal frame assembly generally illustrated in FIG. 4. The frame assembly includes a plurality of front and back upright corner support standards 36*a* and 36*b* respectively connected by upper and lower front and back transverse frame members 37*a* and 37*b* respectively and intermediate front and back transverse members 38*a* and 38*b* respectively. The front and back corner upright support standards 36 and the front and back transverse frame members 37 are interconnected by a plurality of side transverse frame members 39*a* and 39*b* respectively for the left and right sides of the frame structure as viewed from the front of the machine. The frame members 36, 37, 38 and 39 collectively define a rectangular frame structure for supporting the chassis and other components of the machine. The refrigeration unit for the machine is generally located in that portion of the internal cavity defined by the framework, and positioned below the intermediate transverse frame members 38. The product storage portion of the internal cavity defined by the framework is generally located above the intermediate transverse frame members 38.

Figure 2:
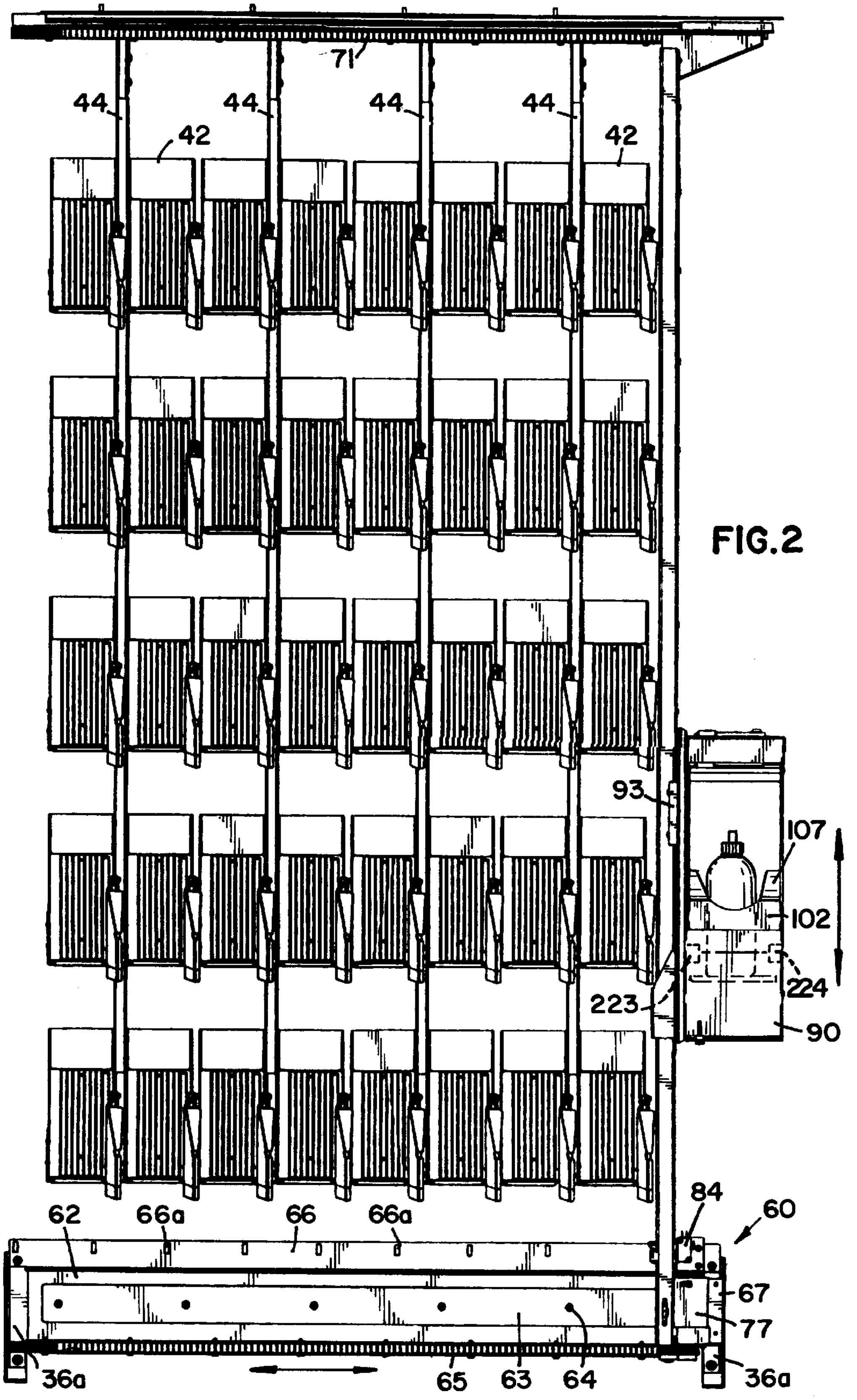
FIG. 2 is an enlarged front elevational view of the inner beverage tray assembly of the vending machine of FIG. 1, also illustrating the robotic beverage capture assembly of the vending machine.

The beverage containers housed by the upper portion of the internal cavity of the vending machine 20 are supported by means of a plurality of beverage trays, two of which are generally indicated at 42 in FIG. 4. While the preferred embodiment used beverage "trays", it will be appreciated that the principles of the invention could also be applied to conventional beverage holding shelf configurations having partitions for separating the containers into ordered rows or aligned queues of beverages extending from front to back in the internal cavity. In the preferred embodiment, the beverage trays 42 are mounted to a plurality of vertically oriented tray mounting standards, one of which is illustrated at 44 in FIG. 4. The vending machine of the preferred embodiment includes four such vertically oriented tray mounting standards 44, as indicated in FIG. 2. The tray mounting standard has a pair of vertically oriented and laterally spaced (from front to back) rib members 45*a* and 45*b* respectively. The rib support members 45 are integrally formed with upper and lower support brace portions 46 and 47 respectively that extend in generally horizontal manner in the direction from front to back of the machine. The upper support brace member 46 is secured to an intermediate upper transverse frame member 38 that is mounted between the front and back upper transverse frame members 37*a* and 37*b*. The lower support brace member 47 is fixedly secured to the intermediate front and back transverse frame members 38*a* and 38*b* respectively. The collective support and brace member portions 45–48 which comprise the vertically oriented tray mounting standard 44 form in the preferred embodiment a solid fixed mounting structure for the beverage trays 42.

The vertical spaced ribbed support members 45*a* and 45*b* of the tray mounting standard 44 include regularly longitudinally spaced mounting holes (generally indicated at 50) for mounting the beverage trays 42 to the tray mounting standard 44. In the preferred embodiment, the mounting holes 50 are positioned along the rib support members 45 such that successive trays 42 mounted to the rib support members 45 can be positioned at relative spacings that accommodate beverage containers of varied heights. In the preferred embodiment, the trays 42 can be mounted along the spaced rib support members 45 so as to accommodate beverage containers held by the trays up to 9 inches in height. Obviously, the relative vertical spacing between the trays 42 and the number of trays mounted to the tray mounting standards 44 is a matter of design and marketing choice. In the preferred embodiment, the trays 42 are secured to the rib support members 45 through the mounting holes 50 by means of mounting clips 52 which enable the trays 42 to be rapidly connected and disconnected from the tray mounting standard 44 when positioning adjustment of the trays 42 is desired. Alternatively, the trays could be secured to the mounting standards by bolts on other appropriate fasteners. In the preferred embodiment, the vertical alignment of holes 50 in the foremost vertical support rib 45*a* are relatively lower than the corresponding mounting holes 50 in the rearmost vertical rib support member 45*b* such that when a support tray 42 is mounted to the spaced rib support member 45*a* and 45*b*, the tray 42 will be inclined at a downwardly depending angle from back to front of the vending machine to enable beverage containers carried thereby to slide by gravity toward the open front (i.e. dispensing) end of the tray. In the preferred embodiment, the preferred angle of inclination of the tray with the horizontal is from about 8–20 degrees and most preferably about 12 degrees. The degree of inclination is a design parameter that can be varied, depending upon the type, size, weight, configuration, etc. of the container being held, the relative coefficient of friction between the container and the tray floor surface, the type of materials used to construct the tray, the temperature of the internal cavity, etc. It will also be appreciated that the principles of this invention do not require movement of the products toward the dispensing end of their respective trays or shelves to be accomplished entirely by gravity. Other biasing assist techniques well known in the art could also be employed.

The vertically oriented tray mounting standards 44 are configured to securely support oppositely disposed pairs of beverage trays 42 as indicated more fully in the frontal view of the tray assembly illustrated in FIG. 2. It will be appreciated that the foregoing description with respect to the tray mounting assembly of FIG. 4 only illustrates a single tray mounting standard 44 with only several incomplete tray assemblies 42 attached thereto, for ease of description purposes. A more complete tray assembly as it might appear mounted within the vending machine is illustrated in FIG. 2. Referring thereto, it will be noted that the completed assembly includes four tray mounting standards 44 transversely spaced from one another so as so accommodate two beverage trays therebetween, with the outermost tray mounting standards 44 being spaced from the upright comer posts 36 of the frame support structure so as to accommodate a single tray width therebetween. While the widths of the trays can vary in the preferred embodiment the product trays can accommodate beverage containers of up to 3 inches in diameter. It will be appreciated that while all of the beverage trays 42 connected to the vertical mounting standards 44 at a particular height are aligned with one another in FIG. 2, such orientation does not have to be uniform so as to define ordered horizontal rows of beverage product within the machine. In the preferred embodiment illustrated, there are five such rows or shelves of the product trays. Due to the flexible height adjustment capabilities for the trays as provided by the vertically oriented tray mounting standards 44, each tray can be positioned along its vertical mounting standard at a different height which would accommodate the particular product size and arrangement configuration desired within the machine.

In the preferred embodiment, each of the trays 42 is shaped in the configuration of a U-shaped channel, generally having a lower surface or floor support surface 42*a* and a pair of oppositely disposed side walls 42*b* upwardly extending from the floor 42*a* at right angles with respect thereto. In the preferred embodiment, the side walls are spaced so as to accommodate beverage containers of up to 3 inches in diameter; however, it will be recognized that the invention is not limited by such dimension or to other non-claimed dimensions described herein. The floor 42*a* is designed to minimize sliding friction therealong. The mounting clips or bolts 52 are secured to and/or through the side walls 42*b* of the trays 42 at appropriate longitudinal locations therealong for fastening registry with the mounting holes 50 of the vertical rib support members 45, as previously described. In the preferred embodiment each of the trays is designed to hold a collective beverage container weight of up to about 20–25 pounds. The beverage trays indicated in FIG. 4 comprise the basic tray element portion of a completed tray, and are illustrated in FIG. 4 without any beverage container release or extended side wall provisions, as will be hereinafter described in more detail. The front or dispensing end of the trays 42 which address the glass door are generally indicated by the numeral 43. It will be appreciated that other tray or product support configurations such as, for example, wire grid trays could be used.

Beverage containers carried by the plurality of open-faced trays 42 are removed from the trays and transported to the product delivery port 32 by means of a robotic beverage capture and transport assembly, generally indicated at 60 in FIG. 4. The robotic assembly 60 operates within the vend selection space 61 (FIG. 3) which is generally that space or volume between the inner surface of the door 24 and the front surfaces of the front frame members 36*a*, 37*a* and 38*a*. The robotic system will be described with reference to an X, Y, Z coordinate system in the machine. The X-direction is horizontal and parallel to the floor. The Y-direction is the vertical direction and perpendicular to the X-direction. The Z-direction is orthogonal to the XY plane and relative to the vending machine is in the direction from the front to back of the machine. The robotic beverage capture and transport assembly 60 generally includes a pair of horizontally mounted rail/rack assemblies, a vertically oriented shuttle bar that rides along the horizontal rails in the X-direction, a carrier frame that moves in the Y-(vertical) direction along the shuttle bar, and a pick-up or transfer mechanism that is mounted to and moves with the carrier frame and operates in the Z-direction to remove a beverage container from a selected tray.

The lower rail assembly includes a mounting plate bracket 62 which is secured to and between the front upright comer support standards 36*a* and to the front intermediate transverse frame member 38*a* (FIG. 4). A lower stationary slide bar 63 is secured, in horizontal manner, to the mounting plate bracket 62 by means of a plurality of spacers 64. A lower horizontal gear rack 65 is secured to the mounting plate bracket 62, generally below and in spaced relationship to the stationary slide bar 63. An optical X-position indicator plate 66 is mounted to the front comer support standards 36*a* of the frame of the vending machine. The indicator plate 66 has a plurality of markers, generally indicated at 66*a* longitudinally spaced therealong in the X-direction for providing optically detectable position markings for enabling the robotic assembly to align with the columns of trays 42 in the "X" direction. A lower moveable slide bar 67 has a pair of side slide block members 67*a* which define oppositely disposed longitudinal grooves or channels, and which are connected together by means of a steel mounting plate 67*b* for matingly engaging the upper and lower edges of the stationary slide bar 63, enabling the moveable slide bar 67 to cooperatively slide along and be guided by the stationary slide bar 63.

The upper horizontal rail assembly for guiding movement in the X-direction includes an elongate mounting plate bracket 68 that is secured to the upper front transverse frame member 37*a* of the frame. An upper stationary slide bar 69 is secured, in horizontal manner, to the lower elongated surface of the mounting plate bracket 68 by means of a plurality of spacers 70. An elongate upper horizontal gear rack 71 is secured to a lower mounting surface of the upper mounting plate brackets 68 with its gear face addressing the front of the machine. An upper moveable slide bar 72 has a pair of side slide block members 72*a* which define oppositely disposed channels formed therein, connected together by means of a steel mounting plate 72*b* for matingly slideably engaging the outer edges of the upper stationary slide bar 69.

In the preferred embodiment, the upper and lower moveable slide bars 72 and 67 respectively comprise a pair of opposed slotted blocks of plastic or acetyl resin material such as that sold under the Delrin® trademark suitable for providing a lowfriction slideable bearing surface with the stationary slide bars.

Figure 6:
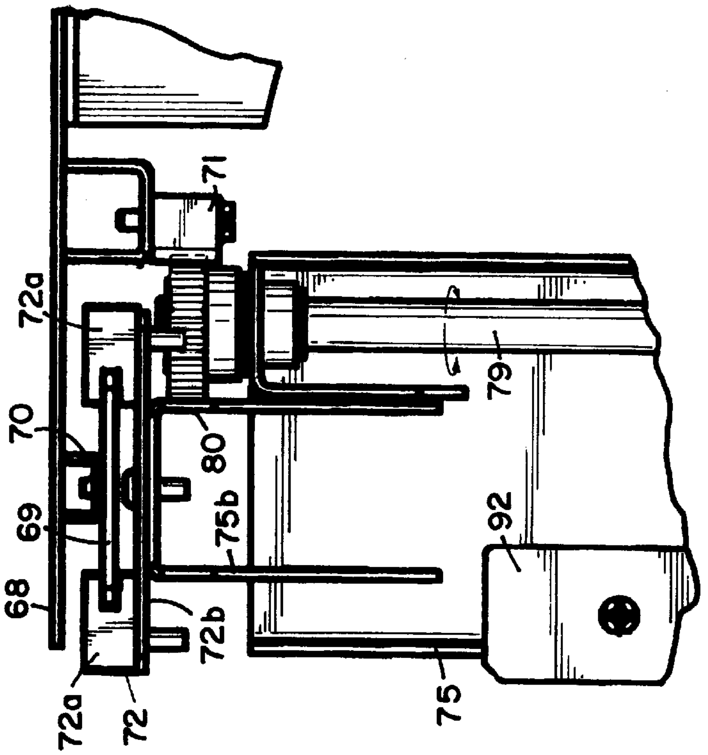
FIG. 6 is a right elevational view of the upper rail assembly of FIG. 5.
Figure 5:
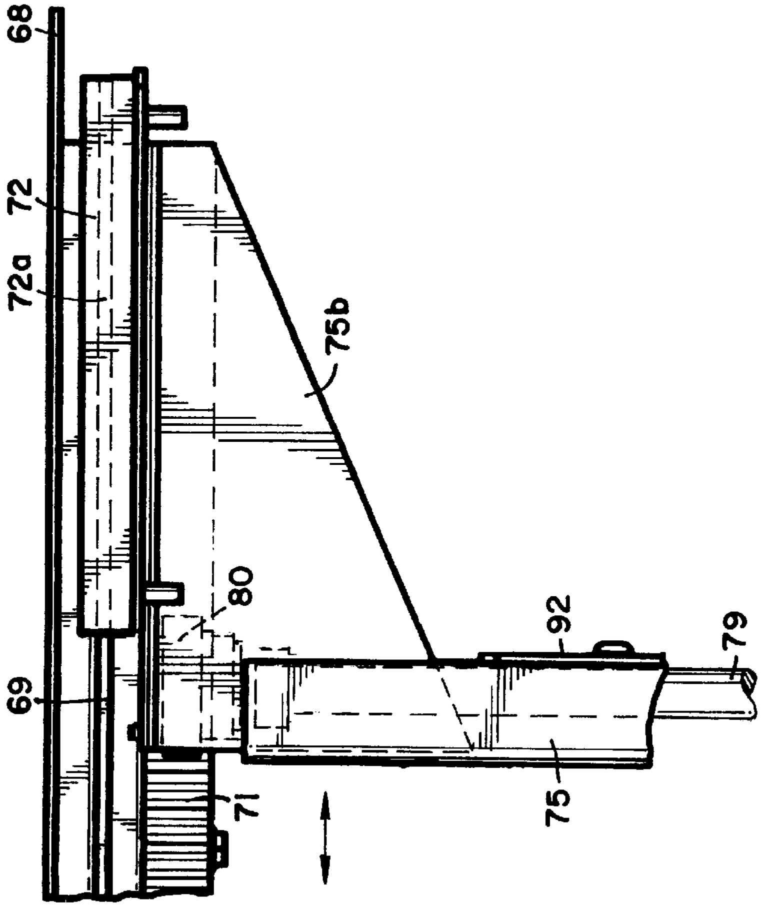
FIG. 5 is an enlarged fractional front elevational view of the upper rail portion of the robotic beverage capture assembly disclosed in FIGS. 2, 3, and 4.

The upper and lower rail assemblies carry a shuttle bar assembly for movement therealong in the X-direction. The shuttle bar assembly has an elongate upright frame member 75 with a lower mounting bracket 75*a* and an upper mounting bracket 75*b*. The lower shuttle bracket 75*a* is secured to the steel plate member 67*b* of the lower moveable slide bar 67, and the upper shuttle bracket 75*b* is secured to the steel mounting plate portion 72*b* of the upper moveable slide bar 72. In the preferred embodiment, the upper shuttle bracket 75*b* is channel-shaped in cross-section, as illustrated best in FIG. 6. This mounting configuration allows the upright shuttle frame member 75 to move in the X-direction as guided by the upper and lower stationary slide bars 69 and 62 respectively.

Movement of the shuttle frame member 75 along the upper and lower slide bars is controlled by an X-drive motor 77, mounted in vertical manner to the lower shuttle bracket 75*a*. The motor 77 is a reversible dc brush gear motor with a dynamic brake. The dynamic brake enables the motor drive gear to stop immediately when the power to the motor is discontinued, enabling accurate positioning of the shuttle assembly in the X-direction. In the preferred embodiment, the motor 77 is a 24 volt dc motor manufactured by Barber Colman, model LYME 63000-731 rated at 5.3 inch-pounds of torque at 151 rpm, whose output shaft is connected to a drive gear 77*a*. The drive gear 77*a* cooperatively engages a first spur gear 78 which is connected by means of an elongate shaft 79 to a second spur gear 80 located adjacent the upper rail assembly. The shaft 79 connecting the spur gears 78 and 80 is journaled through appropriate bearings, one of which is shown at 81 in FIG. 6, which are appropriately mounted to and for movement with the upright shuttle bar frame member 75. The two spur gears 78 and 80 are commonly rotated by the drive gear 77*a* of the X-drive motor 77, and rotate about the axis of the elongate drive shaft 79. The first spur gear 78 cooperatively engages the lower horizontal gear track 65 of the lower rail assembly and moves therealong in the X-direction according to rotation of the drive gear 77*a*. The upper spur gear 80 cooperatively engages the upper horizontal gear track 71 of the upper rail assembly and moves therealong according to rotation of the elongate shaft 79. Accordingly, the X-drive motor 77 controls movement of the shuttle bar frame 75 and attached components in the X-direction by means of the spur gears 78 and 80 engaging and moving along the upper and lower gear tracks 71 and 65 respectively. Such connection ensures a fixed vertical shuttle attitude as it traverses back and forth in the vend selection space and allows for rapid movement in the X-direction without binding and without wobble or vibration that might be associated with worm gear driven configurations.

Figure 8:
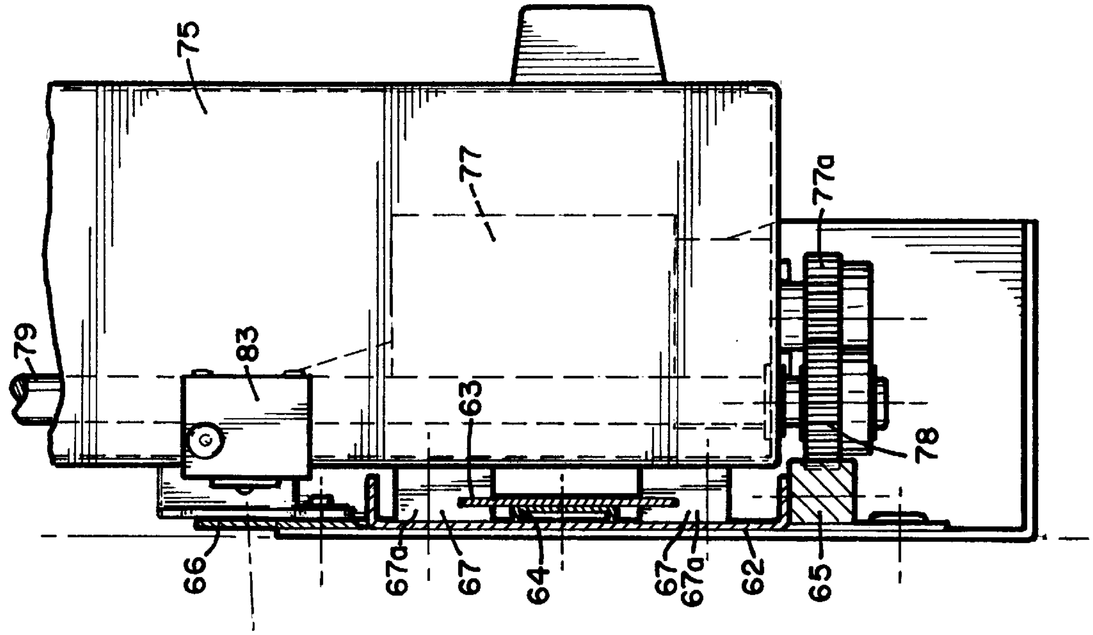
FIG. 8 is a cross-sectional view of the lower rail assembly of FIG. 7, generally taken along the Line 8—8 of FIG. 7.
Figure 7:
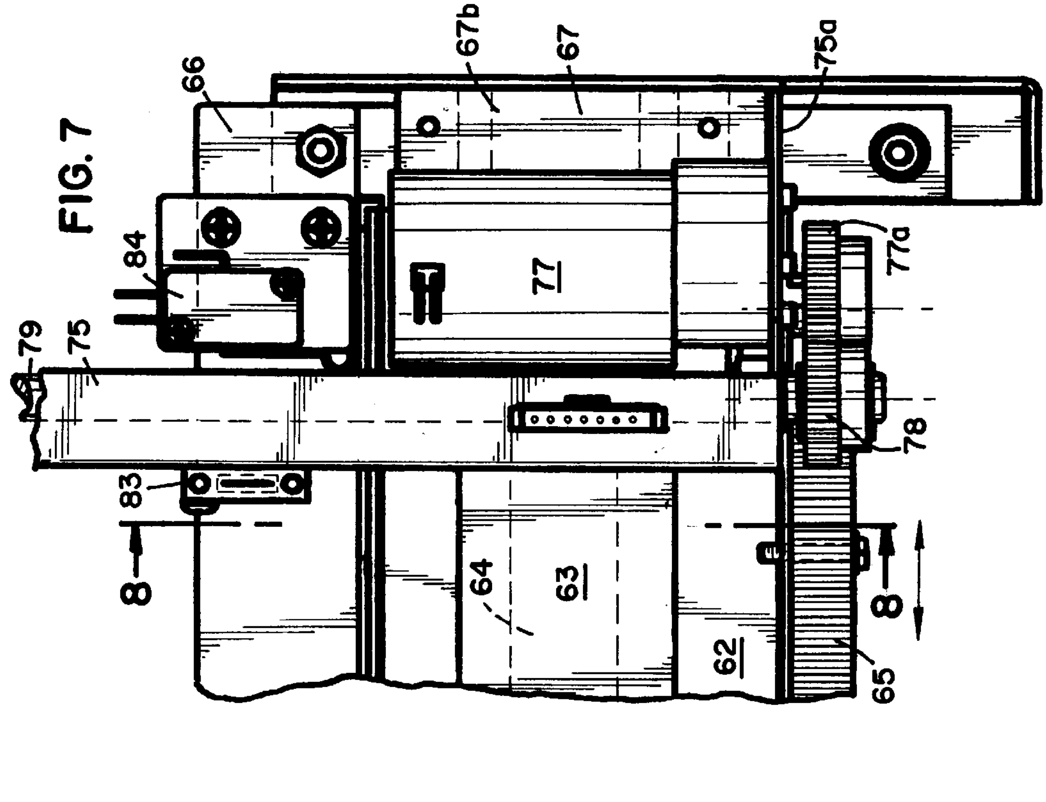
FIG. 7 is an enlarged fractional front elevational view of the lower rail portion of the robotic beverage capture assembly disclosed is FIGS. 2, 3, and 4.

The position of the shuttle movement in the X-direction may be monitored and determined in any appropriate desired manner. In the preferred embodiment, an optical sensor 83 (FIGS. 7 and 8) is mounted to the shuttle frame member 75 and is positioned therealong so as to operatively align with the slots 66*a* in the optical X-position indicator plate 66. Such mounting enables the optical sensor 83 to detect the position slots 66*a* and to thereby provide X-direction location information back to the robotic motion Controller (as hereinafter described).

A limit switch 84 located at the right end of the lower rail assembly and engagable by the shuttle bar assembly as it moves in the X-direction indicates the rightmost or "Home" position of the shuttle bar assembly in the X-direction. The X Home position represents a location of the robotic assembly that corresponds to a final vend position wherein a captured product is presented at the delivery port 32, as will be described more hereinafter.

Figure 3:
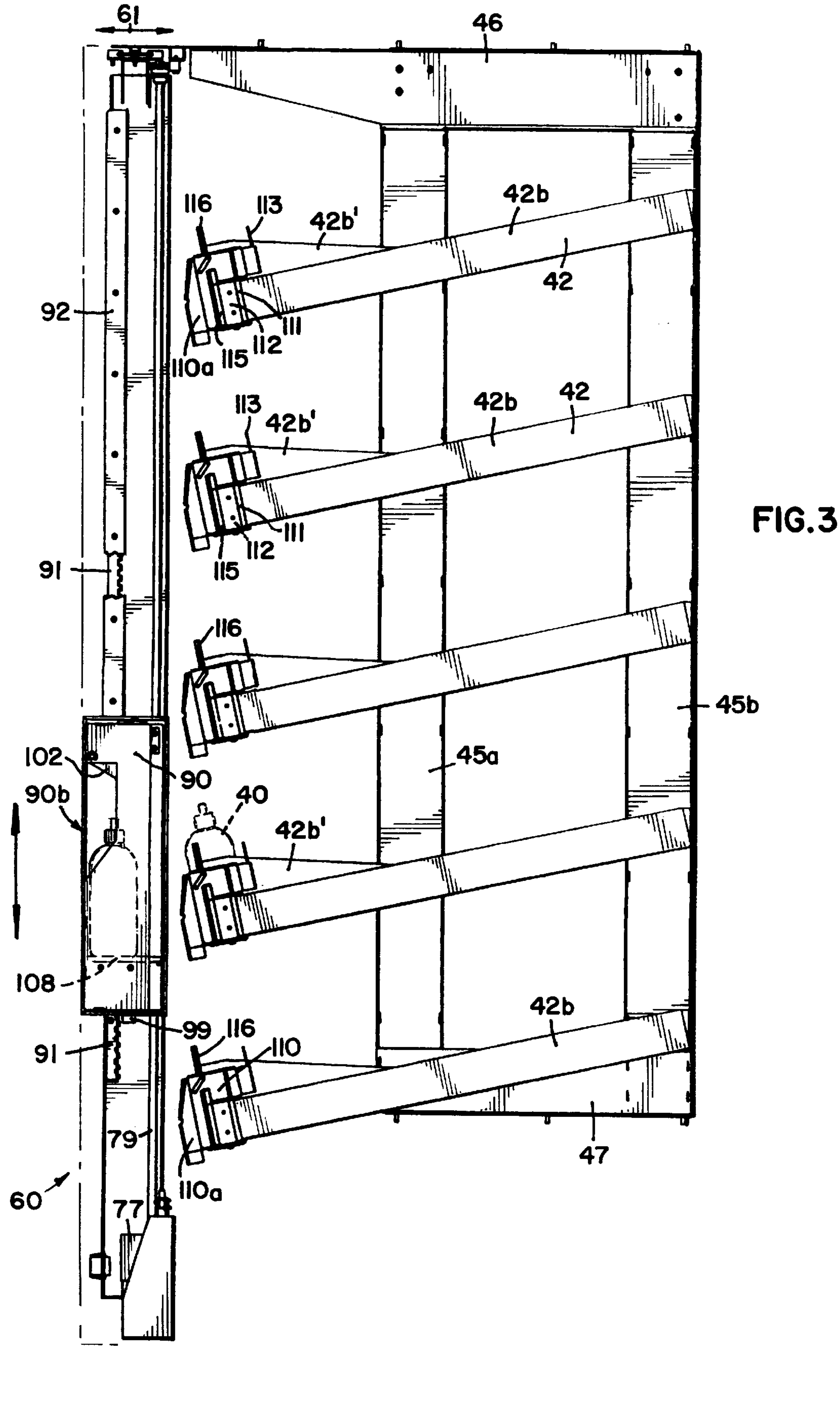
FIG. 3 is a right side elevational view of the tray assembly and robotic beverage capture assembly of FIG. 2.

Movement of the robotic beverage capture and transport assembly 60 in the Y-direction is achieved by means of a carrier frame assembly, generally indicated at 90, that is connected to and vertically moves along the shuttle bar frame member 75, as described in more detail hereinafter. A vertically oriented gear rack 91 (see FIG. 3) is longitudinally mounted along one edge of the elongate shuttle bar frame member 75. A vertical slide bar 92 (similar in nature to slide bars 63 and 69) is secured to one side of the vertical gear rack 91 as illustrated in FIG. 3. The carrier frame assembly 90 is slidably and retainably mounted to and for movement along the vertical slide bar 92 by means of a moveable front slide block 93 mounted to the carrier frame 90 (see FIG. 2) and an oppositely disposed movable rear slide block (not illustrated), also mounted to the carrier frame 90. The front and rear bearing blocks have oppositely disposed grooves formed therein which are cooperatively configured to slidably engage the outer edges of the vertical slide bar 92 in manner similar to that previously described with respect to the upper and lower X-rail assemblies. In the preferred embodiment, the carrier frame assembly 90 also includes an elongate bearing block secured thereto (not illustrated) through which the elongate shaft 79 passes. The bearing block includes a pair of slideable bearings for engaging the outer surface of the shaft 79 as it rotates and as the carrier frame assembly 90 moves therealong in the Y-direction. The bearings of the bearing block need to be capable of handling loads from rotation of the shaft 79 as well as from linear travel along the shaft.

A Y-drive motor 97 having an output drive gear of 97*a* is horizontally mounted to the carrier frame 90 near its upper end, in a manner such that its drive gear 97*a* cooperatively, matingly engages the vertical gear rack 91. The Y-drive motor 97 is a reversible dc brush gear motor that is driven by a pulse width modulated (PWM) signal. In the preferred embodiment, motor 97 is a 24 volt dc motor manufactured by Barber Colman, model LYME 63070-X-9332. Accurate Y-axis positioning of the carrier frame 90 relative to the shuttle bar assembly and stabilization at any "at rest" position therealong is provided by the pulse width modulation signal. The motor 97 is also provided with an optical pulse encoder 100 that counts the rotations of the motor's shaft. The system Controller, translates the number of rotations information into a linear Y-direction information. This information enables the Controller to determine and control the exact vertical or Y-direction position of the carrier frame 90 relative to the product carrying trays 42 within an accuracy of from 1/32 to 1/64 inch. A limit switch 99 (FIG. 3) mounted to the side of the shuttle bar upright frame member 75 is positioned to provide a signal to the Controller indicating that the carrier frame assembly 90 is or is not at its "Home" position in the Y-direction. The Y Home position is a Y axis position that enables the carrier frame 90 to move with shuttle assembly 75 in the X direction into the product delivery area.

Figure 10:
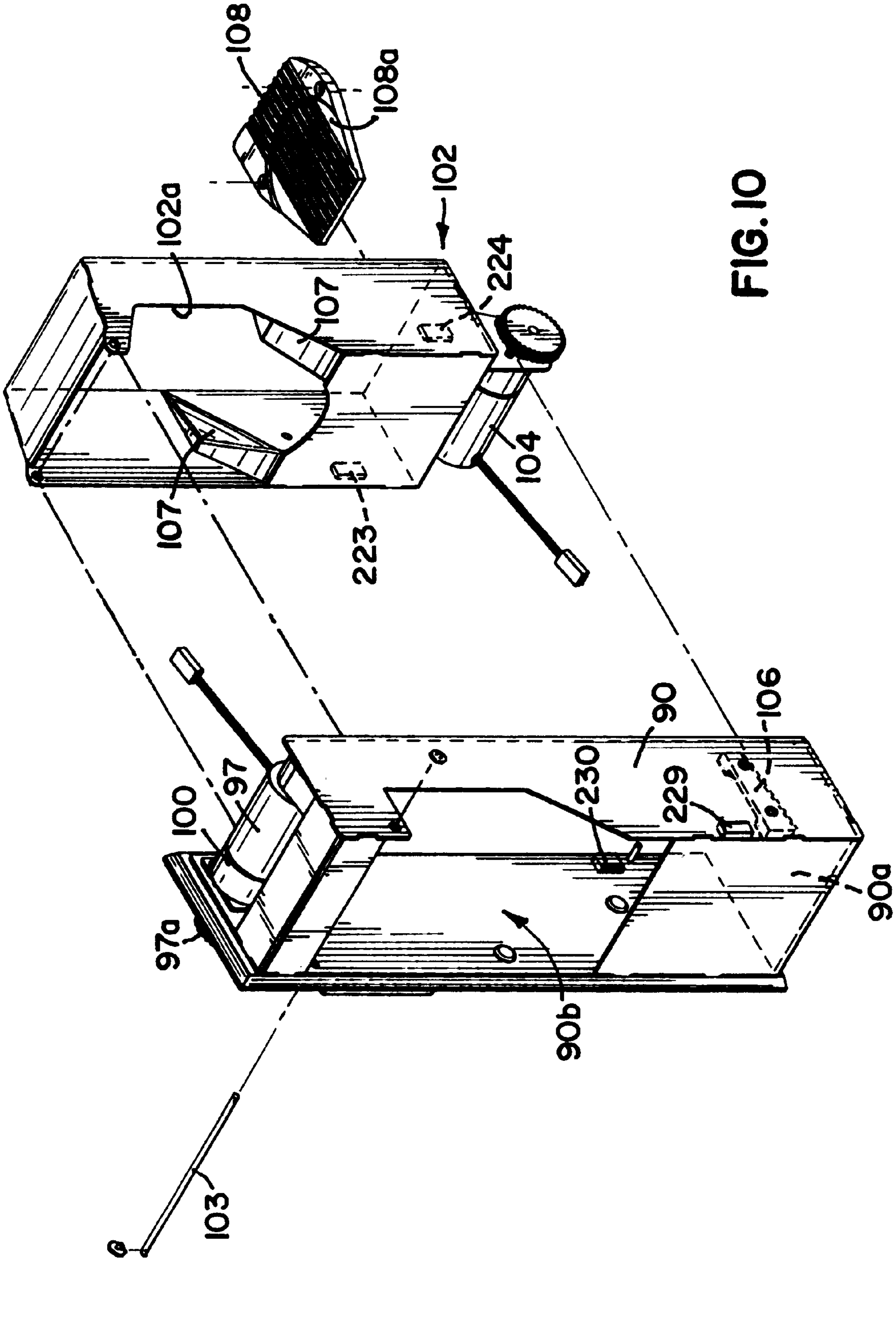
FIG. 10 is an exploded view of the beverage capture cage assembly of FIG. 9.
Figure 12:
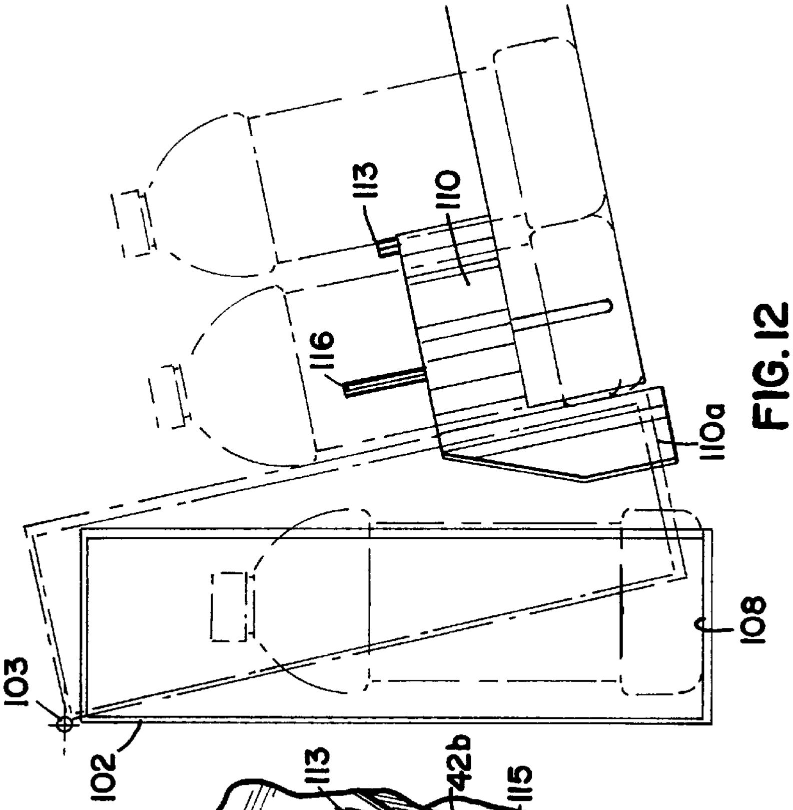
FIG. 12 is a diagrammatic side view illustrating movement of the beverage capture cage portion of the robotic beverage capture assembly during a vend cycle.

The carrier frame assembly 90 supports a beverage capture assembly that can assume various configurations. For example, the beverage capture assembly may be configured as a robotic arm that grasps and lifts the selected beverage container into the carriage frame assembly. However, in the preferred embodiment, the beverage capture assembly comprises a simple pivotal assembly that rotates in the Z-axis direction to release and capture a beverage container from a customer selected tray 42. Referring to FIG. 10, the beverage capture assembly is generally indicated at 102. The beverage capture assembly 102 is pivotally mounted to the carrier frame assembly 90 by means of a pivot hinge member 103 for pivotal rotation about the axis of the hinge 103. As indicated in FIG. 10, the beverage capture assembly 102 cooperatively fits and moves into nesting position within the outer shell of the carrier frame assembly 90. The carrier frame assembly 90 has an open bottom 90*a* and an access port 90*b* formed through its front wall. A Z-drive reversible dc brush gear motor 104 with a dynamic brake, is mounted to the bottom of the beverage capture assembly 102 and has an output drive gear 104*a*. In the preferred embodiment motor 104 is a 24 volt dc motor manufactured by Barber Colman, model JYHE-63200-741 rated at 3.5 inch pounds of torque at 46.6 rpm. A segment of arcuately shaped gear rack 106 is secured to one side wall of the carrier frame assembly 90 and is positioned relative to the position of the drive gear 104*a* such that the drive gear 104*a* cooperatively and matingly engages the teeth of the gear rack segment 106. When the Z-drive gear motor 104 is energized so as to move the drive gear 104*a* in a clockwise manner (as viewed in FIG. 10), the lower portion of the beverage capture assembly 102 moves outward from its first position in nesting engagement with the carrier frame assembly 90 about the pivot axis of the hinge 103 (as indicated in FIG. 12), to a second or extended position. Reversal of the motor drive, such that the drive gear 104*a* rotates in a counterclockwise direction (as viewed in FIG. 10) causes the beverage capture assembly 102 to return to its retracted position in nesting engagement with the carrier frame assembly 90. A pair of limit switches 230 and 229 mounted to the carrier frame assembly 90 indicate respectively when the beverage capture assembly 102 is fully extended or fully retracted (i.e. in its first or second positions). Switch 229 indicates that the beverage capture assembly 102 is fully nested within the carrier frame 90, whereas switch 230 indicates when the beverage capture assembly 102 is in its fully extended position. The beverage capture assembly 102 includes an access port 102*a* in its front surface that cooperatively aligns with the access port 90*b* of the carrier frame assembly when the two are nested together. Both the carrier frame assembly 90 and the beverage capture assembly 102 have open back surfaces. The beverage capture assembly 102 further includes a pair of tapered beverage container guide members 107 connected to its opposed side walls and tapered in a manner so as to converge toward the front face of the beverage capture assembly for assisting in centering and supporting the outer surface of a beverage container carried by the beverage capture assembly, as will be appreciated more upon further description of the invention. The beverage capture assembly 102 further includes a floor insert member 108 having an upper friction reduced slidable surface similar in nature and material to that of the trays, and a circular detent 108*a* portion formed therein for retaining the bottom edge of a beverage container 40 captured by the beverage capture assembly. The beverage capture assembly further includes a transmissive optical sensor, positioned just above the floor insert member. The optical sensor includes a transmitter 223 and a receiver 224 between which an optical signal passes. When the signal is broken by a beverage container received by the beverage capture assembly, a "product present" signal is sent to the system Controller.

Figure 9:
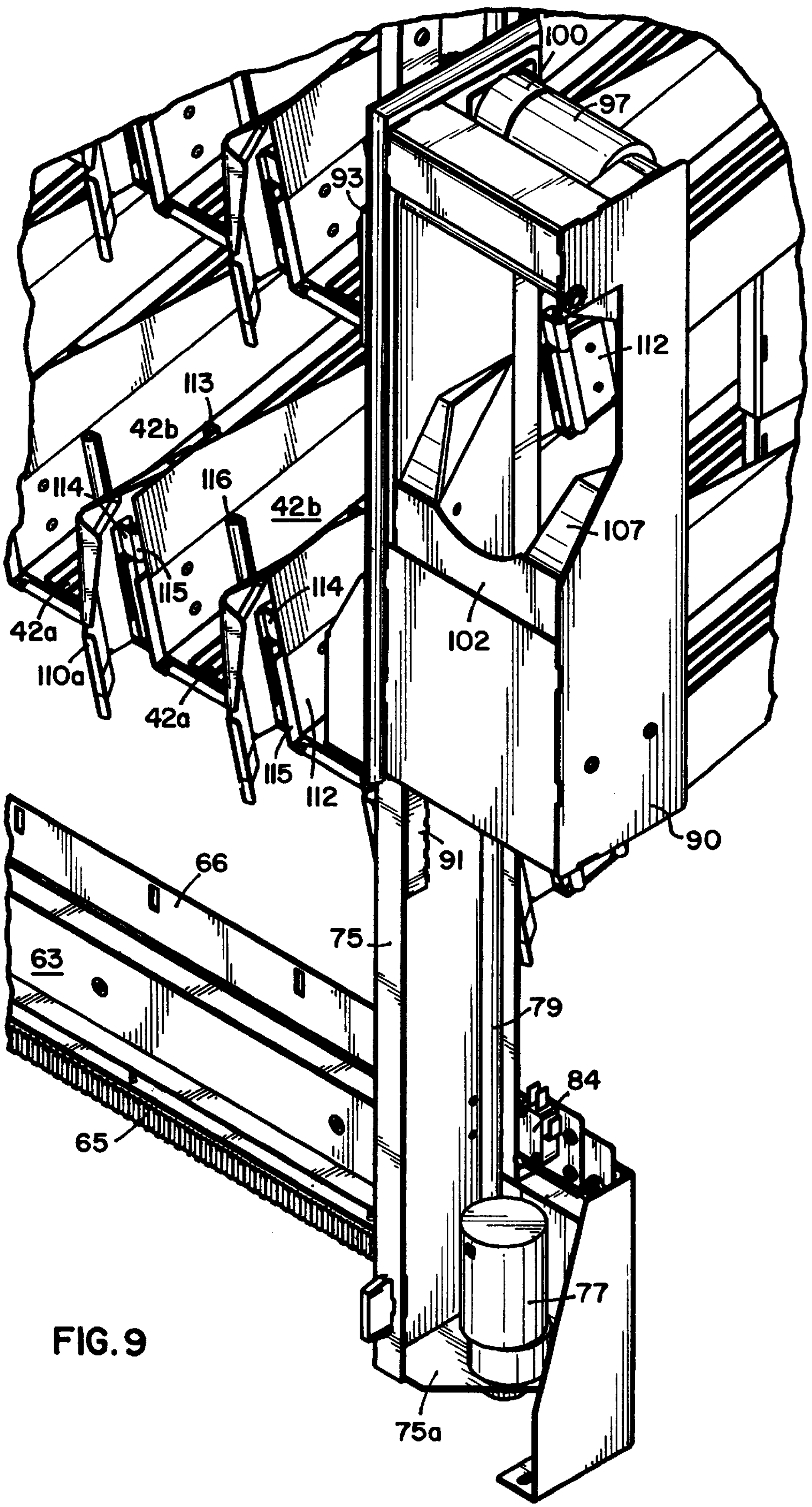
FIG. 9 is an enlarged fractional perspective view of the beverage capture cage portion of the robotic beverage capture assembly of FIGS. 2, 3, and 4.

The previous description of the beverage trays 42 described a simple unembellished U-shaped open end beverage delivery tray configuration. In the preferred embodiment, the delivery end portion of the tray has been modified to achieve the vending purposes of this invention. Referring to FIGS. 2 and 9, it will be noted that each of the lower floor portions 42*a* of the beverage trays 42 provide an extremely low-friction surface. The low friction property may be achieved by numerous different techniques and materials. In the preferred embodiment the floor insert is approximately 2 inches wide to provide support and stability to the beverage containers carried thereby. In the preferred embodiment the insert material is an acetyl resin material sold under the Delrin® trademark. It will be appreciated that other materials capable of providing a low friction surface can also be used. For example, but not by way of limitation, filled polystyrene or glass thermoplastic composites or bubble construction principles could also be used. It will be noted that for simplifying the Drawing, the floor insert has not been illustrated in all of the Figures. In the preferred embodiment, the cross-sectional configuration chosen for the insert is a ribbed or corrugated configuration wherein the width of the raised rib portions is approximately 1/16th of an inch, compared to a ¼ inch spacing between the ribs (i.e. a ratio of approximately 1:4). It will be appreciated that other ratios and other low friction configurations as well as alternate configurations such as wire or rollerfloor configurations could be used. A low-friction tray floor surface is desirable to ensure that the beverage containers freely slide by gravity along the floor surface, toward the open dispensing end of the tray. This is particularly true for a tray assembly configuration wherein only the weight of the beverage container and gravity are used to slide the container toward the dispensing end of the tray. The particular surface configuration of the tray floor, in combination with the angle of inclination of the tray are design parameters that can be varied, in view of the nature of the beverage containers that are to be dispensed, in order to provide for optimal movement of the beverage containers along the tray floor surface.

Figure 11:
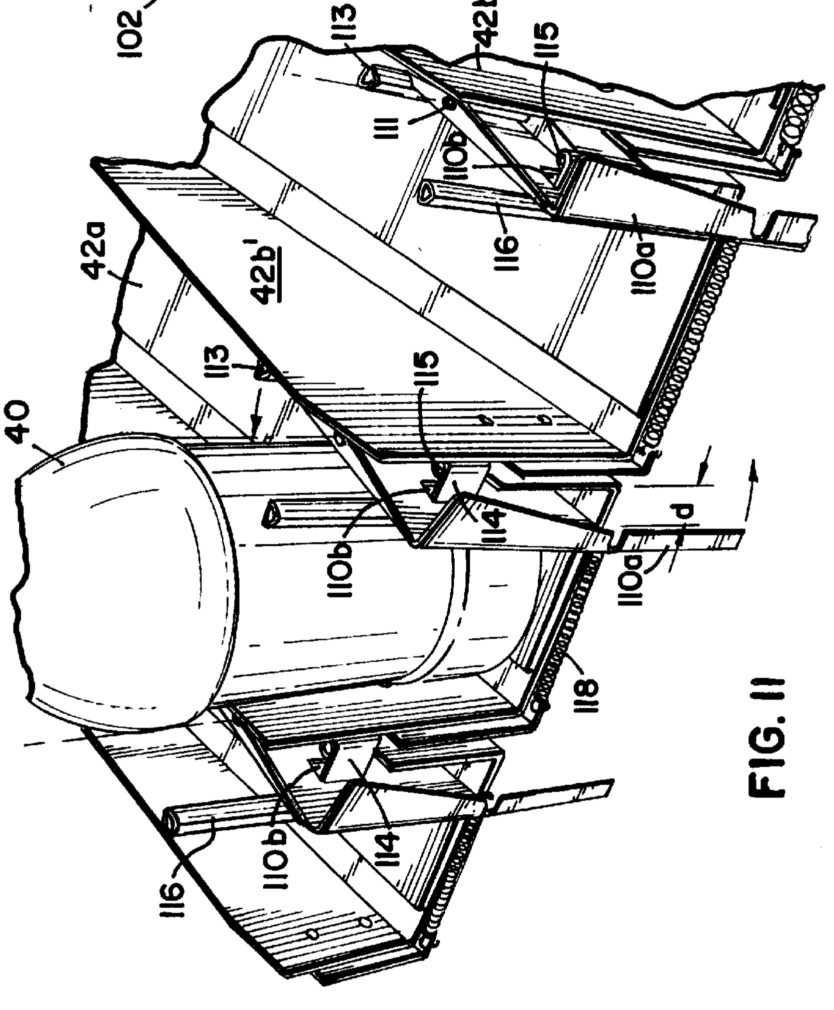
FIG. 11 is an enlarged fractional perspective view of the front end of a beverage try illustrating a preferred configuration of a release mechanism in operative position relative to a beverage container.
Figure 13A:
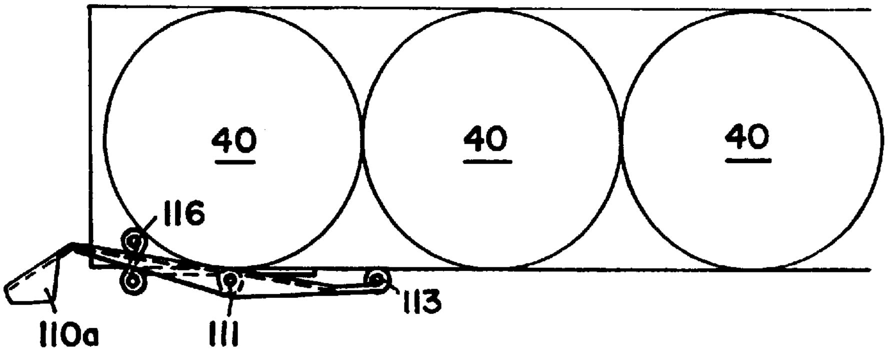
FIG. 13 is a diagrammatic top view illustrating the sequential movement of the container release mechanism during a vend cycle.
Figure 13B:
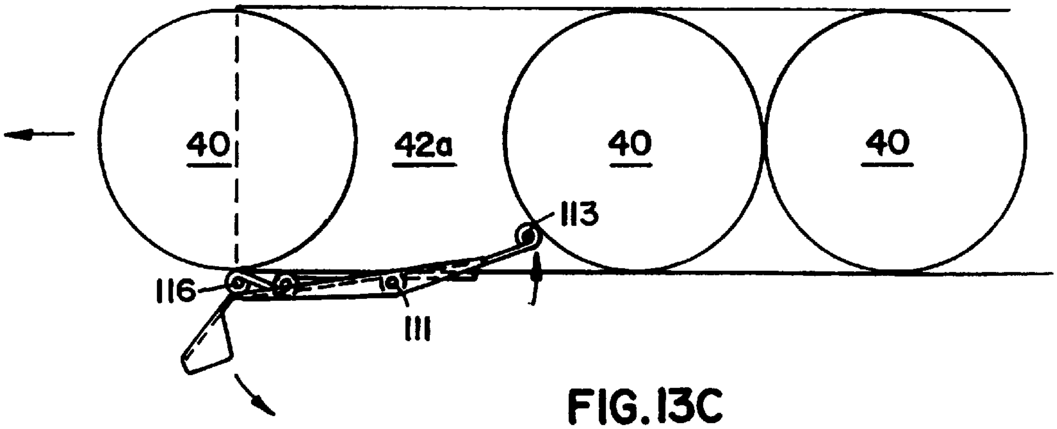
Figure 13C:
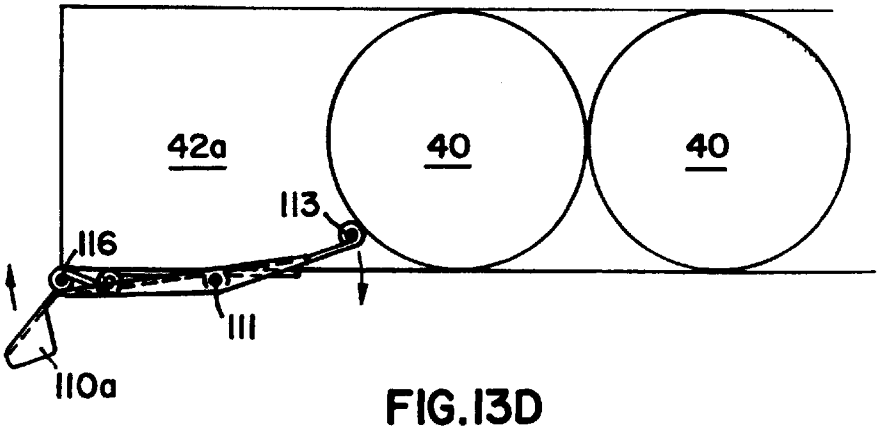
Figure 13D:
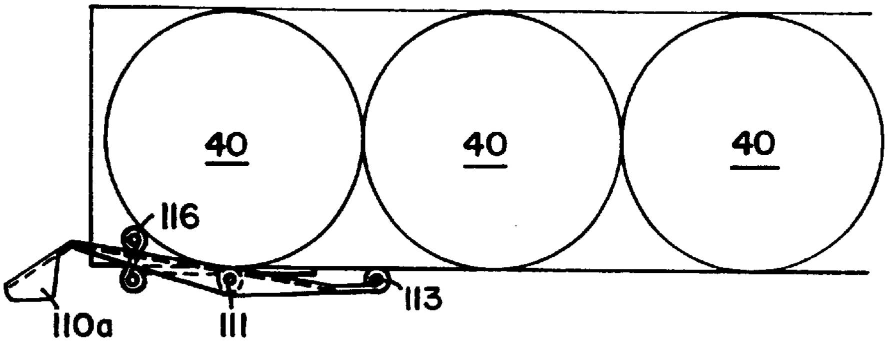

Referring to FIGS. 3, 9 and 11, it will be noted that those portions of the tray side walls 42*b* located adjacent the open dispensing end of the trays have been raised or increased in height by means of extension portions, generally indicated at 42*b*'. The added height provides for extra stability of the beverage container at the tray's outlet end, to minimize sideways or lateral tipping of the beverage container during the dispensing operation.

The beverage containers carried by a tray 42 are held within the tray and are either prevented or allowed to exit from the open end of the tray by means of a container release apparatus. In the preferred embodiment, the container release apparatus is entirely "passive" in nature (i.e. does not require any electrical or other energy powered mechanism residing on the trays, for its operation). The container release mechanism is best described with reference to FIGS. 3, 9, 11 and 12. Referring thereto, the container release mechanism includes a primary pivotal lever guide arm 110 which is pivotally connected to the right side wall 42*b* of a tray (as viewed from the open front delivery end of a tray) by a first hinge pin 111. The first hinge pin 111 and a second hinge pin 115 (later described) are secured by a bracket 112 to the outside surface of the right side wall 42*b* of the tray (as shown in FIG. 3) and have their operable mounting portions extending upwardly above the upper edge of the right side wall. The lever guide arm 110 is secured to such upwardly projecting portion of hinge 111. The hinge pin 111 connection to the tray side wall is positioned such that the portion of the lever guide arm 110 that is located "forward" of the hinge pin 111 has a front portion thereof that extends outward, beyond the front edge of the tray floor. The foremost portion 110*a* of the lever guide arm 110 is bifurcated and bent at two angles to the general plane of the lever guide arm to form a pair of forward cam surfaces. The angled cam surfaces provide a broad "target" area for engagement and activation by movement of the beverage capture assembly 102, as hereinafter described. The lowermost of the cam surfaces extends slightly below the floor of the tray. The rearmost portion of the lever guide arm 110 is pivotable about the hinge 111 toward the open portion of the tray 42 with which it is associated (i.e. away from the side wall 42*b*) and retainably holds a first beverage engaging rod member 113 that is oriented generally perpendicular to the floor 42*a* and generally parallel to the side walls 42*b* of the tray 42. The height of the beverage engaging rod member 113 can vary to accommodate different heights of beverage containers. The lower edge of the rod member 113 is carried by the lever guide arm 110 in spaced relation to the tray floor and floor insert members. The purpose of the beverage engaging rod member 113, as will become clear upon a more detailed description, is to engage a beverage container in the tray and prevent its sliding movement along the tray in the direction toward its dispensing end.

That portion of the lever guide arm 110 located forward of the hinge pin 111 also includes a slot passageway 110*b* formed therethrough for slidably accommodating a second lever arm 114 that is pivotally mounted to the right side wall 42*b* for movement about the second hinge pin 115. The second hinge pin 115 is mounted by the bracket 112 adjacent the forward edge of the right side wall 42*b*, as indicated in FIGS. 3, 9 and 11. The second lever arm 114 extends through the slot 110*b* to a distal end which retainably holds a second beverage engaging rod member 116 which is similar in nature to that of the first beverage engaging rod member 113, and serves the same general purpose (i.e. to block movement of a beverage container along the floor of the tray). The slot 110*b* in the lever guide arm 110 is strategically positioned relative to the hinge pin 115 and its attached lever arm 114 such that when the lever guide arm 110 is positioned in its normal position as illustrated in FIG. 11, the "forward" edge of the slot 110*b* will engage the forward face of the second lever arm 114 to cause the second lever arm 114 to project outwardly and generally perpendicularly, laterally across the tray 42 so as to position the second beverage engaging rod member 116 held thereby directly in the path of the first-in-line beverage container, preventing the beverage container from advancing out of the open end of the tray. This situation is illustrated in FIG. 11. The second beverage engaging member 116 need not be positioned in the center of the tray to accomplish its purposes. It need only engage the beverage container along its outer circumference at a position there along such that the forward most edge of the container does not project out beyond the front edge of the tray. The primary pivotal lever guide arm 110 is held in this "container engaging" position by means of a spring 118 transversely extending below the front edge of the tray, secured between the forward edge of the left side wall 42*b* or floor of a tray and a forward portion of the lever guide arm 110. It will be noted that when the primary lever arm is positioned in it's "normal" position, the spring 118 holds the general plane of the forward portion of the lever arm 110 slightly spaced from the side wall 42*b*, by the distance "d" as illustrated in FIG. 11, to prevent pivotal motion of lever 114. When the rod member 116 is in such container engaging position (FIG. 11), the rearmost portion of the lever guide arm 110 and its associated first beverage engaging rod member 113 will be positioned in resting engagement against the right side wall 42*b* of the tray so as to allow passage of beverage containers along the tray lower surface and toward the open end thereof.

This is the "normal", "unactivated" mode of operation of the beverage container release apparatus. The slot 110*b*, lever arm 114, engagement member, pivotal travel of the lever guide arm 110 about its hinge 111, and tension of the spring 118 are collectively and cooperatively designed such that the forces applied to the engagement member 116 by a full tray of beverage containers as a result of their collective weight vectors in the (−Z) direction (i.e. toward the open end of the tray) will not cause the first or second lever arms 110 or 114 to pivot about their axes in a container releasing direction (counter-clockwise when viewed from above). In such position, the lever arm 114 will be prevented from rotating by the forces applied to it by engagement with the slot 110*b* of the first lever arm.

When an activating force, in a Z-direction toward the open face of the tray and from external thereof, is applied to the forward cam surface of the foremost portion 110*a* of the lever guide arm 110, such cam activating force causes the lever guide arm 110 to pivot (in a counterclockwise direction as viewed from above) about its hinge pin 111 against the bias of spring 118. Such pivotal action causes the rearward portion of the primary lever arm to rotate in counterclockwise direction about hinge 111, moving the first beverage engaging rod member 113 into the advancing path of a second-in-line advancing beverage container, and forces the forward portion of the lever guide arm to pivot 110 into resting engagement with the right side wall 42*b* of the tray. As the lever guide arm 110 rotates about the hinge pin 111, the forward portion of the lever guide arm will "slide" to the right as viewed from the front of the machine, against the second lever arm 114 by reason of the slot 110*b*, until the lever guide arm 110 is in resting engagement against the right side wall 42*b*. As such sliding motion occurs, the lever guide arm 110, through its slot 110*b*, will no longer retard pivotal movement of the second lever arm, and the second lever arm 114 will pivot, as a result of forces applied to it by the first-in-line beverage container engaging its beverage engaging rod member 116, in a counterclockwise direction as viewed from above, about the second hinge pin 115, until the second lever arm 114 rests generally parallel to and alongside the lever guide arm 110. At that position the second beverage engaging rod member 116 will lie in resting engagement against the forward portion of the lever guide arm 110, allowing the first-in-line beverage container to freely slide by gravity out of the open end of the tray 42. At the same time, the first beverage engaging rod member prevents sliding motion of the second-in-line container and all containers behind it, from sliding down the tray. This process is further described in more detail hereinafter in relation to a "vend cycle" and FIGS. 12 and 13.

When the "activating" pressure against the forward cam surface of the foremost portion 110*a* of the lever guide arm 110 is released, bias of the spring 118 against the forward portion 110*a* of the guide arm 110 will cause the lever guide arm 110 to return to its normal position by pivoting in a clockwise direction (as viewed from above) around its hinge pin 111. Such pivotal action will cause the wall of the slot 110*b* in the lever guide arm 110 to apply pressure against the second lever arm 114, rotating the second lever arm 114 about its pivot hinge 115, which in turn will move the second beverage engaging rod member 116 back to its "blocking" position near the front of the tray. During this "return" procedure, there are no forces from beverage containers being applied to the lever arm 114, since the first beverage engaging rod member 113 is holding back the beverage containers remaining in the tray. However, as the rod member 116 is returning to its blocking position, the rod member 113 is simultaneously returning to its normal position alongside the side wall 42*b*. The "return to normal" cycle time is fast enough so as to allow the lever 114 and its associated rod 116 to return to their normal positions before the beverage containers released by the rear rod 113 slide into advancing engagement with the rod 116.

Figure 14:
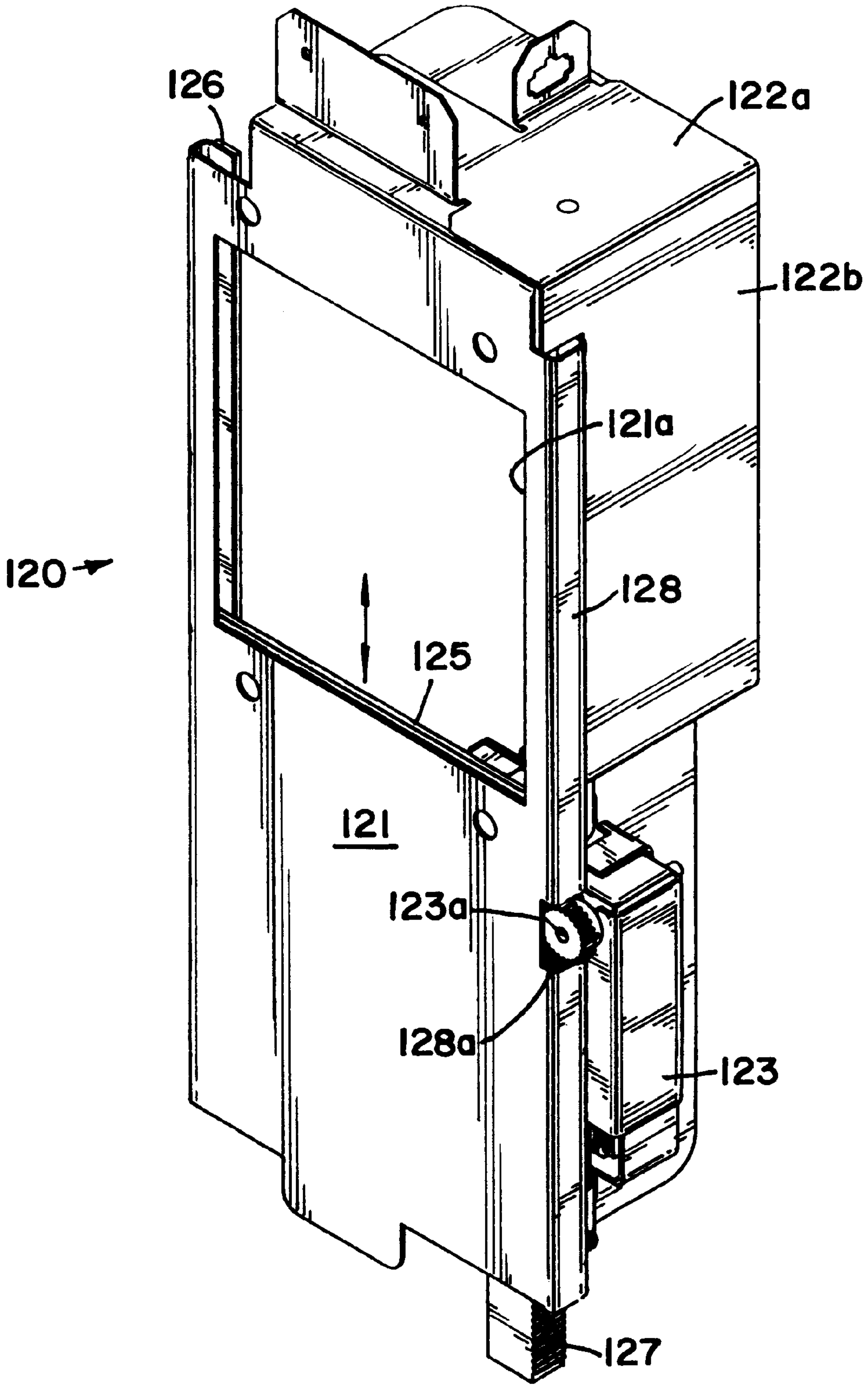
FIG. 14 is an enlarged top, front, right side perspective view of the delivery door assembly of the vending machine of FIG. 1.
Figure 15:
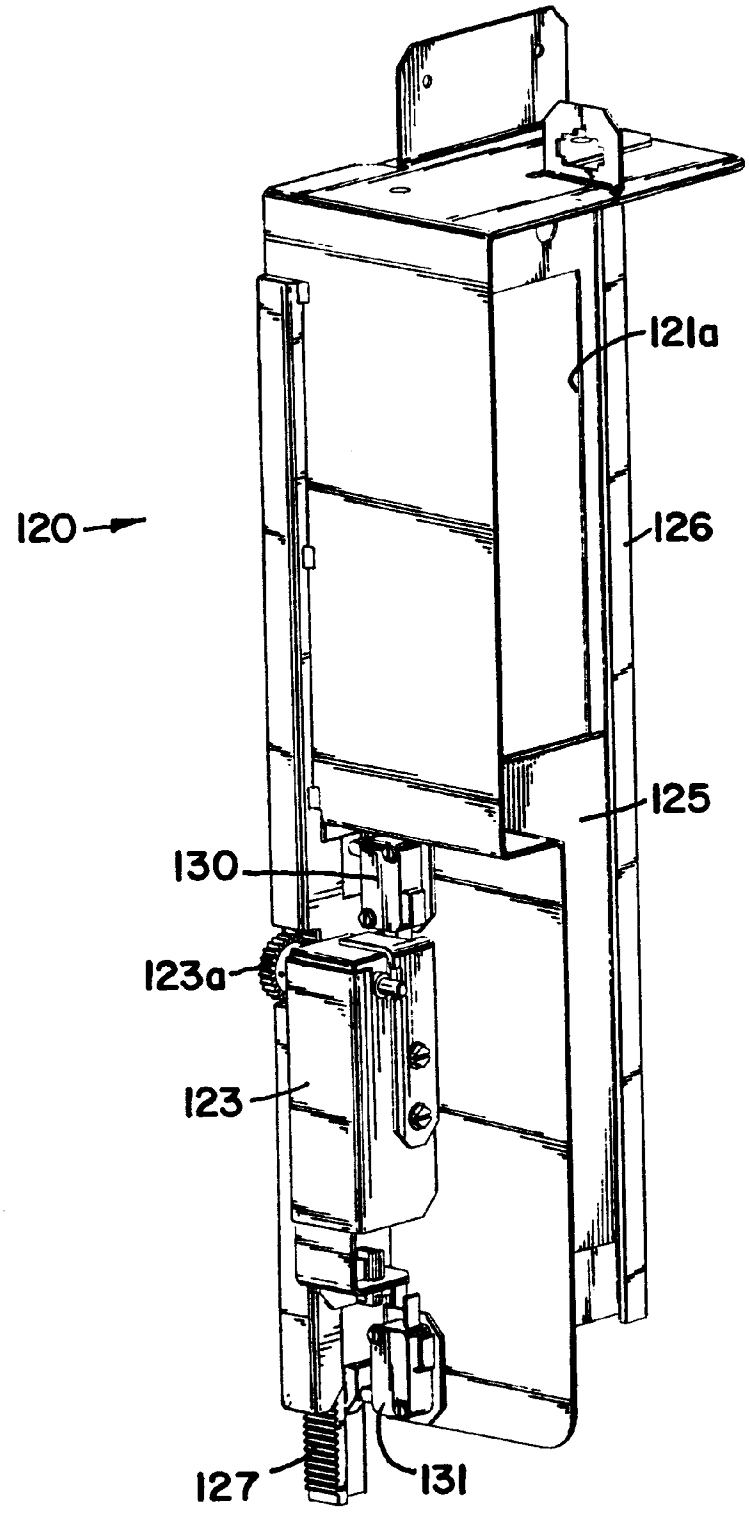
FIG. 15 is a top, right, back side perspective view of the door assembly of FIG. 14.

Referring to FIG. 1, the product delivery port 32 has associated therewith an automated delivery door opening and closing assembly, illustrated in FIGS. 14 and 15. As indicated above the product delivery port is preferably located between thigh and waist level so that the customer does not have to unduly bend to retrieve the vended product therefrom. In a preferred configuration, the height of the delivery port is at least 27 inches from the floor and more preferably at a height of 30 inches or more. FIG. 14 illustrates the door opening assembly 120 as it would be viewed from the front right side of the vending machine, and FIG. 15 illustrates the door opening assembly as it would appear from its right back position. The door opening assembly 120 generally has a front mounting plate 121 defining an access port 121*a* therethrough which cooperatively aligns with the product delivery port 32 formed in the front panel of the vending machine door 24. The door opening assembly 120 also has top and right side wall portions 122*a* and 122*b* respectively, but does not have a left side panel. The open left side enables the moveable carrier frame assembly 90 and its mating beverage capture assembly 102 to move into cooperative docking alignment with the door opening assembly 120 such that the access port 121*a* of the door opening assembly operatively aligns with the access port 90*b* of the carrier frame assembly 90 and the access port 102*a* as the beverage capture assembly 102 at the end of a vending cycle. This position also correspond to the X Home and Y Home positions. A reversible electric motor 123 having an output drive gear 123*a* is mounted to the right side panel 122*b* of the door opening assembly. The door opening assembly 120 further includes a slidable door panel 125 that is mounted for sliding movement in the vertical direction. The left side (as viewed from the front) of the door panel 125 slides within a channel 126. The right side of the door panel 125 is integrally connected with a gear track extension 127 that rides within a retaining channel (generally indicated at 128) of the door opening assembly. The output drive gear 123*a* of the electric motor 123 is positioned to engage the gears of the gear track extension 127 through an opening 128*a* in the right side channel 128. As the electric motor 123 is energized, the output drive gear 123*a* rotates to move the engaged rear track extension so as to raise and lower the slidable door panel 125. The door panel is illustrated in its lowered position in FIGS. 14 and 15. A pair of limit switches 130 and 131 are mounted to the right side wall 122*b* of the door opening assembly 120 for respectively detecting the raised (closed) and lowered (open) positions of the door panel 125. The gear driven door configuration provides a secure door opening mechanism that is not easily pried open by vandals or thieves when in a closed position. The product delivery port also has associated therewith a security lock system for locking the carriage frame assembly 90 in its docked position at the product delivery port at the end of a vend cycle. Such locking prevents unauthorized or vandalous entry into the interior of the vending machine through the product delivery port when the delivery door is open. The security locking apparatus generally includes a motorized lock, indicated generally at 218 in FIG. 1, a sensor 216 for detecting a locked status and a sensor 217 for detecting an unlocked status. Those skilled in the art will appreciate that such locking apparatus can assume many mechanical configurations, the details of any one of which are not limiting to the scope of this invention. Further, while a particular configuration of a vertically movable door has been described, those skilled in the art will appreciate that other configurations, as for example, rotatable door panels can also be used.

Figure 16A:
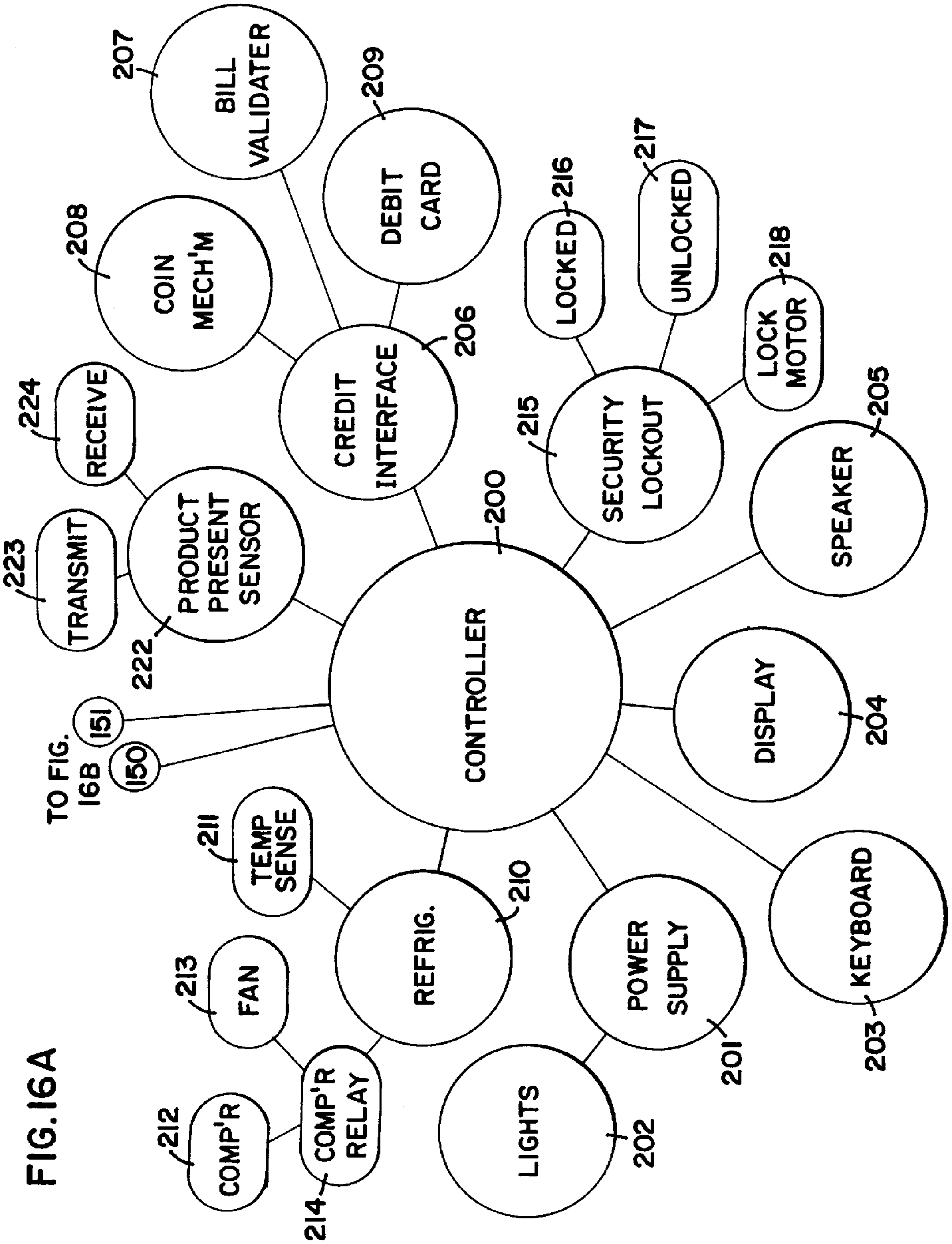
FIGS. 16A and 16B form a schematic diagram illustrating the various components of the vending machine and their functional relationship and interaction.
Figure 16B:
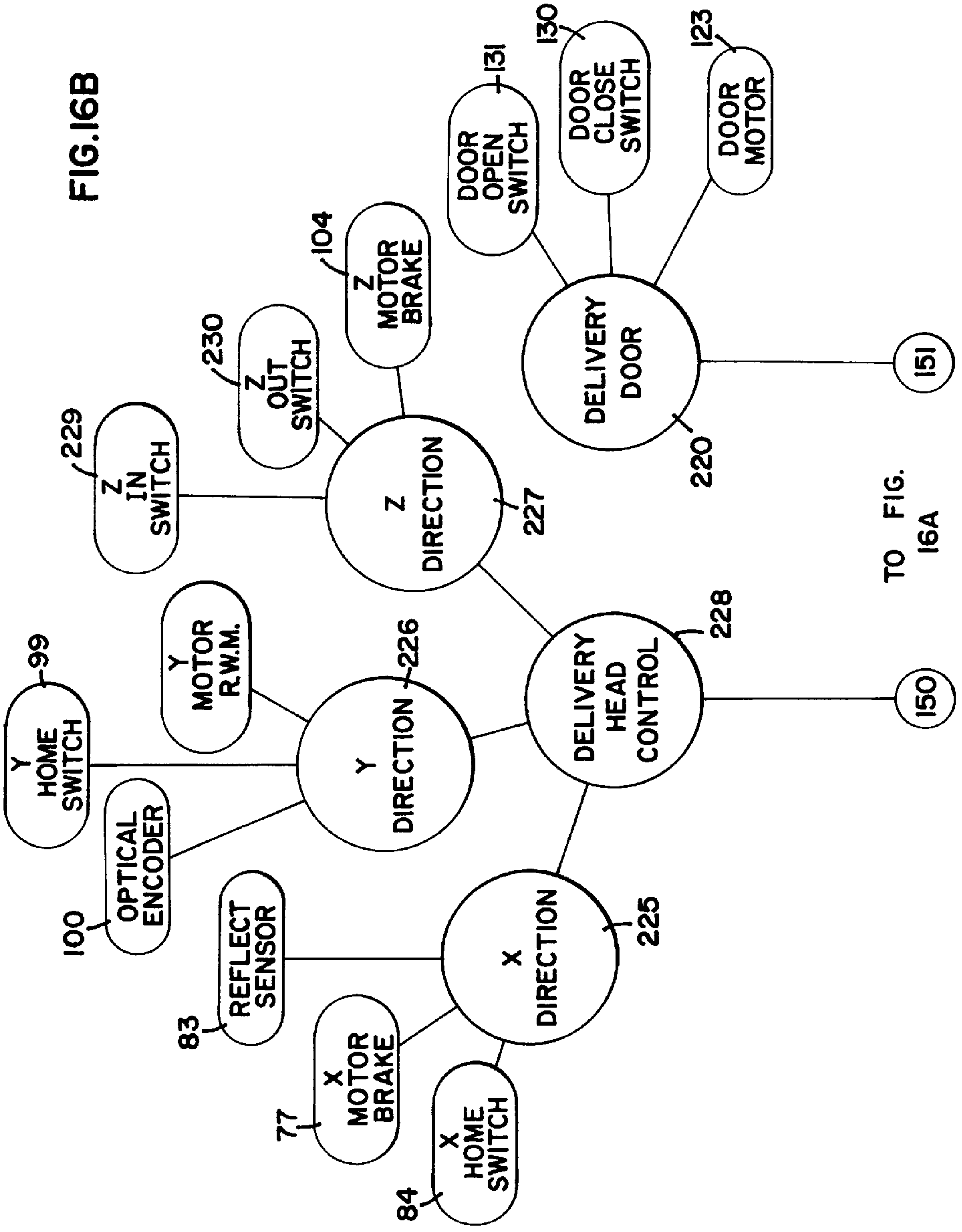

FIGS. 16A and 16B generally illustrate the various electronic and control functions and components of the vending machine and their functional relationship and interaction to one another. FIG. 16 is not intended to be exhaustive of all functional and electronic details of the machine, but is a general overview of the major functions. The primary functions of such machines are well-known in the art and will not be detailed herein, since they do not form a part of the invention. It is well within the province of one skilled in the art to configure a vending machine in the proper format configuration and under proper control for which it is intended to serve. Accordingly, it is not believed necessary to further belabor such generalities in this application. In general, a Controller 200 provides all centralized control functions for the vending machine. A Controller could be in the nature of a computer or a microcontroller with embedded code, having a central processing unit through which all functions in the machine can be programmed controlled and coordinated. Such a central processing unit would include such things as a main program stored in memory that operates in connection with a plurality of other files such as utility files, screen picture files, screen voice files, product data files, sales report files, documentation files, robotic path files, and the like - generally-known to those skilled in the art. In a typical machine, the Controller 200 is coupled to a power supply 201 upon which it depends for its own energization, and may control the application of power from the power supply to other functions throughout the system. In this regard, it should be noted that while various electrical components have been disclosed in describing the preferred embodiment, no power connections have been illustrated as associated with those components, it being understood that appropriate power connections are provided in the operative machine. The power supply 201 is also connected to provide various lighting functions (202) required in the machine. The Controller 200 is also connected to operator input means, generally designated as a keyboard 203, which can represent both a service keyboard for programming and entering information into the Controller as well as the product selection keys or pads located on the front of the machine. Controller 200 also operates various other customer interface features such as a display panel 204, possibly a speaker 205, and appropriate credit interface networks, generally represented at 206. The credit interface function 206 communicates with such peripheral systems as bill validators 207 a coin mechanism 208 and a debit card network 209. Controller 200 also controls the refrigeration functions 210 which include communication with and control of such ancillary functions as temperature sensors 211 and the compressor 212 and fan 213 which are typically operated through a compressor relay 214.

The Controller 200 controls the security lockout functions previously described for locking the carriage frame assembly 90 at the product delivery port following a vend cycle, generally indicated at 215. The security lockout function includes communication with the locked sensor 216, the unlocked sensor 217 and the locking motor 218.

The Controller 200 also communicates with and controls the functions associated with the operation of the delivery door (functional block 220) and the various functions of the robotic beverage capture and transporting functions. The delivery door function, includes communication with the door open and door closed limit switches 131 and 130 respectively and the door control motor 123. The product present sensor function of the transmissive optical sensor 222 mounted in the beverage capture assembly 102 communicates with the Controller 200. The transmitted and receiver portions of the product sensor are indicated at 223 and 224 in FIG. 16A. The X, Y and Z-direction control functions, generally indicated at 225, 226 and 227 respectively are coordinated through a delivery head control network 228 which communicates with Controller 200. The X-direction control function communicates with the X-Home switch 84, the X-drive motor and brake 77 and the X-position optical sensor 83. The Y-direction control function 226 involves communication with the Y-motor optical encoder 100, the Y-Home switch 99 and the Y-drive motor 97. The Z-direction control function 227 communicates with the Z-in and Z-out switches 229 and 230 respectively mounted on the carrier frame assembly 90 for detecting pivotal motion of the beverage capture assembly 102 and the Z-drive motor and brake 104.

In operation, the plurality of trays 42 within the vending machine are adjusted relative to their associated support tray mounting standards 44 to accommodate the relative heights of the products desired to be vended. The trays are then loaded with the desired beverage containers through the open door 24. The loaded beverage containers are retained in ordered manner on their respective trays by means of the container release mechanisms previously discussed, at the forward ends of the trays. In general, the machine has two modes of operation, a "Service" mode which is entered whenever the door 24 is open and will not be discussed herein. The normal mode of operation is the "Operate" mode and is the one which is of general concern to this invention. Upon entering the "Operate" mode a diagnostic check is performed on the vending mechanism. If the diagnostic check fails, the Controller 200 takes the unit out of service and displays an appropriate "Out-of-Service" message on its display panel 204.

After a power-up or reset condition, the Controller goes through a start-up sequence which energizes the various functional peripherals of the system. In an idle state, the external display of the machine will show the accumulated credit amount when no keypad or vend activity is present. If there is still a beverage container or product in the delivery bin of the machine an appropriate message such as "PLEASE REMOVE PRODUCT" will be flashed continuously until the product is removed. Keypad depressions and credit accumulation is disabled if a product is still in the delivery bin. The carriage frame assembly 90 will be locked in its docked position at the product delivery position. The credit accumulation, credit acceptance and the handling of cash, bills and tokens is similar to that of other vending machines and is well-known in the art.

Figure 17A:
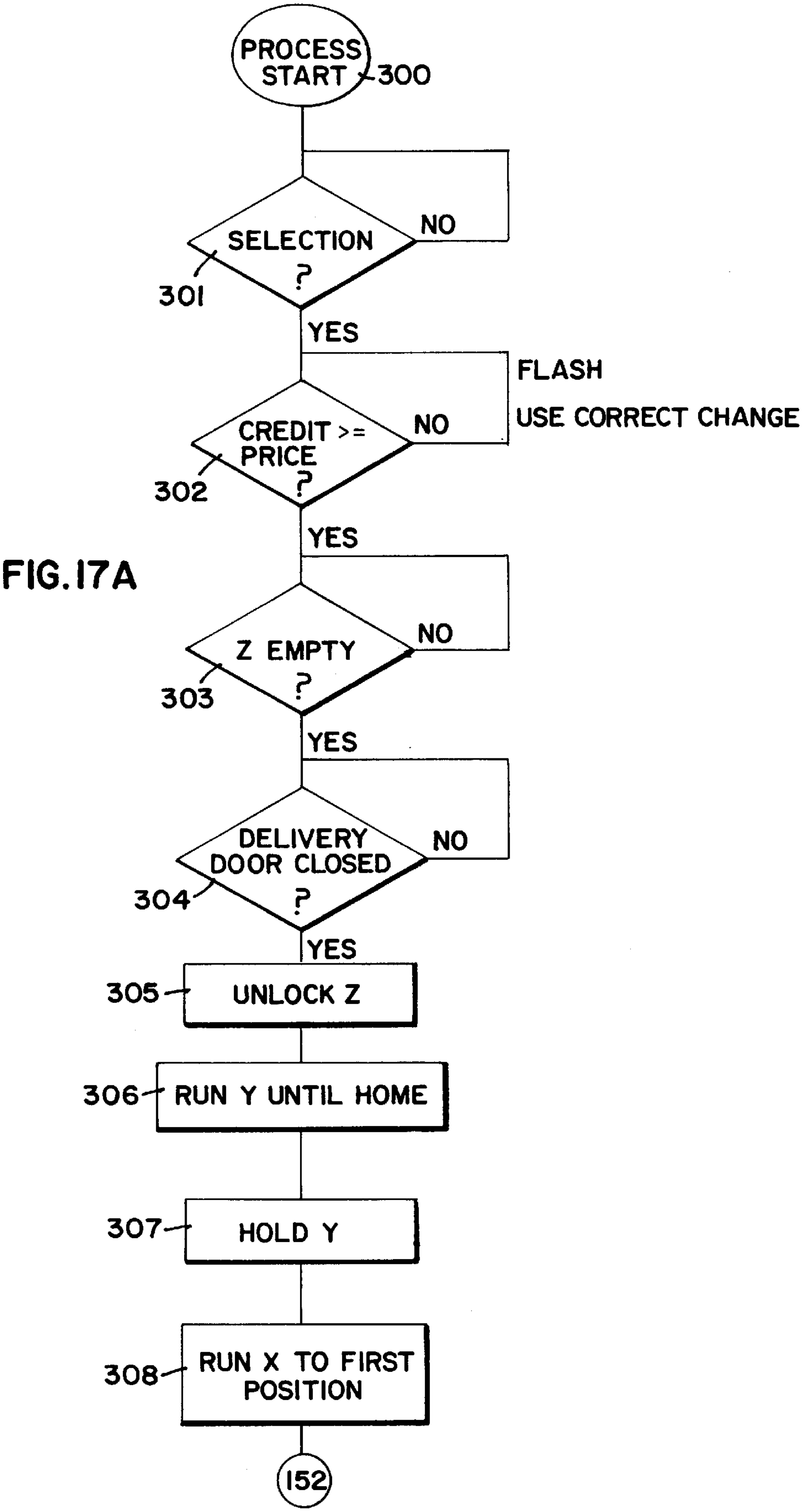
FIGS. 17A and 17B form a flow chart illustrating various operations performed by the vending machine under computer control during a vend cycle.
Figure 17B:
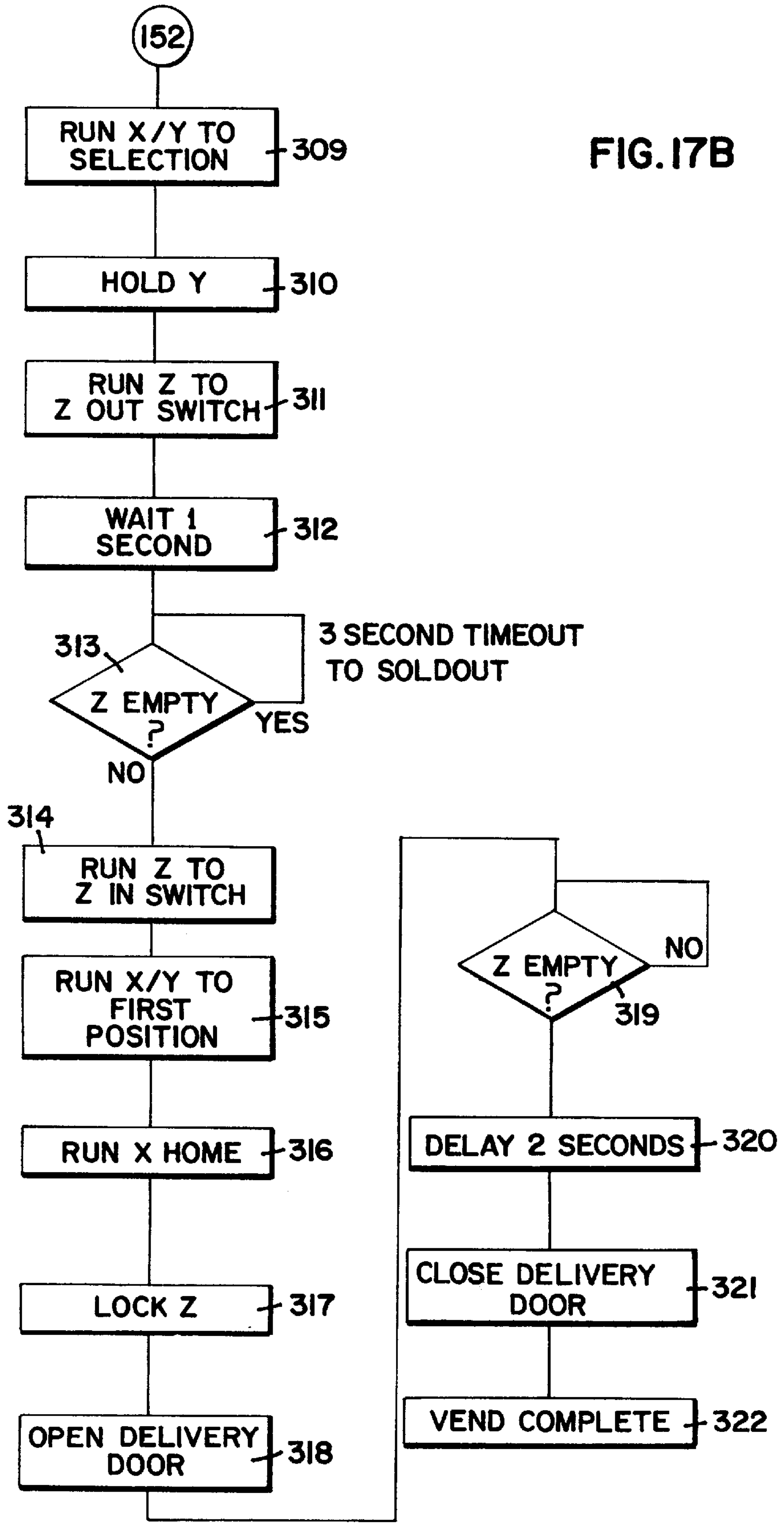

The process of initializing a "Vend Process" is illustrated in the flowchart of FIGS. 17A and 17B. Referring thereto, following the start-up sequence 300, generally described above, the Controller continually looks to see if a keypad entry or selection has been made (301). When a selection is entered on the keypad, the Controller will determine (302) whether sufficient credit is available for the given selection. If the accumulated credit is greater than or equal to the selection price, a vend attempt will be made for that selection. During this time, the customer's selection will also be shown on the display panel. If the credit accumulated is less than the selection price, the price will be flashed for three seconds or until a new selection key is pressed. Also, if the level of the coin changer assembly's least value coin tube is below its lowest sensor, the "Use Correct Change" sign will be continuously illuminated.

Assuming that proper credit has been accumulated for the selected product, the Controller will ensure that the beverage capture assembly 102 is empty (303). If the beverage capture assembly 102 still contains a beverage container, the Controller will not allow the vend cycle to continue until the beverage container has been removed from the capture mechanism. The Controller then checks to see if the delivery door 125 is positioned in a closed position (decision block 304). If the door is open, the Controller will not allow the vend cycle to proceed.

If both the conditions of an empty beverage capture assembly and a closed delivery door are satisfied, the vend cycle proceeds and the security lock motor 218 is energized to unlock the carriage frame assembly 90 for movement (305). Once unlocked, the shuttle bar assembly 75 is enabled for movement in the X-direction, and Pulse Width Modulated (PWM) signals are sent to the Y-drive motor 97 to move the carrier frame assembly 90 slightly up, in the Y-direction, to a "hovering" position just above the Home seated area so that the Y-home switch 99 is activated (306). This allows the carriage frame assembly 90 to clear the product delivery area when it begins moving with the shuttle assembly 75 in the X-direction. The carrier frame assembly 90 is held at its hovering Y-position (307) and the shuttle bar assembly is moved in the left X-direction to its first position as detected by the optical column position sensor 83 and the associated optical position indicator plate 66 (308). In the preferred embodiment the "first" X-position is the position in alignment with the right most column of trays in the vending machine, just left of the control panel as viewed in FIG. 1.

The controller then energized both the X and Y drive motors 77 and 97 so as to position the carriage frame assembly 90 in operative position in front of the customer selected tray 42. The particular tray column position (in the X-direction) is sensed by means of the optical sensor 83 and its associated position indicator plate 66. The desired amount of travel in the Y-direction is determined by the optical encoder 100 associated with the Y-drive motor 97, which counts the revolutions of output shaft movement when the Y-drive motor is running. These functions are indicated by block 309 in FIG. 17B. When the carrier frame assembly 90 reaches the desired Y-direction position, its movement is stabilized by means of the PWM drive signal (310), which maintains the carriage frame assembly at the desired Y-direction height. As described above, the PWM Y-motor control feature can enable accurate positioning of the carriage frame assembly relative to the selected tray within $1/32$ to $1/64$ of an inch.

When the carriage frame assembly 90 is properly positioned before the customer selected tray, the Z-drive motor 104 is energized to rotate the beverage capture assembly 102 relative to the carrier frame assembly 90 until the limit switch 230 indicates full rotated extension of the beverage capture assembly 102 (311). As the beverage capture assembly arcuately moves toward the selected tray 42, the forward edge thereof engages the forward cam surface 110*a* of the foremost portion of the lever guide arm 110 on the selected shelf. As the beverage capture assembly continues to rotate in the forward direction, the lever guide arm 110 is rotated thereby about its hinge pin 111, causing the second lever arm 114 to rotate in a counterclockwise direction (as viewed from above), moving the beverage engaging rod member 116 out of engagement with the foremost (first-in-line) beverage container on the selected tray. Simultaneously, the rearmost beverage engaging rod member 113 is moved into blocking position in front of the second-in-line beverage container, preventing the second-in-line beverage container from progressing down the inclined selected tray. Once the rod member 116 is removed from retaining contact with the first-in-line beverage container, the first-in-line beverage container is permitted to slide by gravity out of the open end of the selected tray and into the rotated beverage capture assembly 102 which is now in direct alignment with the selected beverage tray. It should be noted that when the beverage capture assembly 102 is fully rotated by the Z-drive motor 104, as indicated by activation of the Z-out switch 230, the upper surface of the floor insert member 108 of the beverage capture assembly 102 will be co-planarly aligned with the upper surface of the floor insert 42*a* of the selected beverage tray 42 so as to form a continuous sliding surface for the first-in-line beverage container to slide from the open end of the selected tray and into the aligned beverage capture assembly 102 (see FIG. 12). As the first-in-line beverage container slides into the beverage capture assembly, its lower surface will enter the circular detent portion 108*a* of the floor insert member, further retaining the container in fixed placed within the beverage capture assembly. The upper portion of the captured container will engage the tapered beverage container guides 107 to add further balancing support to the captured container within the beverage capture assembly. At this position, the captured beverage container will also activate the product present sensor 222 within the beverage capture assembly, indicating that the selected first-in-line beverage container actually has been dispensed from the selected tray and has been captured by the beverage capture assembly 102. As long as the beverage capture assembly 102 remains in its Z-out receiving position, its engagement with the primary pivotal lever guide arm 110 will maintain the guide arm at its activated/rotated position against the bias of the spring 118, maintaining the second beverage engaging rod member 116 in front of the second-in-line beverage container, to prevent its movement along the lower surface of the selected tray.

Referring back to FIG. 17B, after the Z-out switch 230 has been activated (311), the Controller will wait for one second for the selected first in-line container to slide into the beverage capture assembly (312). The Controller then interrogates the product present sensor 222 to see if the beverage capture assembly 102 has actually received the selected beverage container (decision block 313). If the beverage capture assembly 102 is empty, the Controller repeats this process for up to three times. If the beverage capture assembly 102 remains empty after three cycles through its box 313 check, the Controller assumes that the selected tray is empty and flashes a "Sold Out" signal on the vending machine display. If this condition occurs, the Z-motor is energized to return the beverage capture assembly into the carriage frame assembly, the X and Y motors are energized to return the carriage frame assembly to its Home position, and the customer's money is refunded, ending the Vend cycle.

If the product present sensor 222 indicates that a beverage container has in fact been received by the beverage capture assembly 102, the Controller will activate the Z-drive motor in reverse direction to pivotally retract the beverage capture assembly 102 back into the carrier frame assembly 90 until the Z-in switch 229 indicates that the beverage capture assembly 102 is fully returned in nesting position within the carrier frame assembly 90 (314). As the beverage capture assembly 102 is withdrawn back into the carrier frame assembly 90, its forward edge will release pressure against the forward cam surface of the foremost portion 10*a* of the primary lever guide arm 110, enabling the lever guide arm 110 to be retracted to its normal position under influence of the spring 118. As the lever guide arm 110 rotates back to its initial position, the second lever arm 114 will once again restore the beverage engaging rod member 116 to its blocking position across the open end of the selected tray, while motion of the rearward portion of the lever guide arm 110 will withdraw the beverage engaging rod member 113 from its engagement with the previously second-in-line beverage container. As the rod member 113 releases its contact with the beverage container the second-in-line beverage container will slide under the force of gravity along the tray floor until it comes into resting engagement with the rod member 116. In this position, the previously second-in-line container now becomes the first-in-line container in that selected product tray. Simultaneously, all of the other qued beverage containers carried by that tray will also simultaneously move "forward" in the tray, each advancing one position, toward the dispensing end of the tray. This process is schematically indicated in FIG. 13 for a full vend cycle from the tray. The entire process of having transferred the selected beverage container from the selected tray and into the beverage capture assembly 102 is achieved in smooth continuous manner without dropping the beverage container or imparting any jarring blows or forces to the container.

Once the Z-motor has stabilized following activation of the Z-in switch 229, the X and Y drive motors 77 and 97 respectively are simultaneously energized to move the shuttle bar 75 and the carrier frame assembly 90 back to the "first" X-position, carrying the captured selected beverage container to that position (315). The floor detent 108*a* and the tapered beverage container guides 107 of the beverage capture assembly 102 help support and hold the captured beverage container within the beverage capture assembly during the transport phase. Once the carrier frame assembly 90 reaches the first position, the X-drive motor 77 is activated to move the shuttle bar so as to move the carrier frame assembly 90 to the X "home" position at which point the carrier frame assembly will cooperatively nest within the door opening assembly 120 such that the access ports 121*a*, 102*a* and 90*b* are all in operative alignment (316).

At the X "home" position, both the X and the Y drive motors are deenergized and the carrier frame assembly 90 is locked in position by the locking motor 218 at the delivery station (317). With the lock set, the Controller energizes the delivery door motor 123 until the door open switch 131 indicates that the delivery door is in a fully open position (318). The Controller then interrogates the product present sensor 222 in the beverage capture assembly 102 (decision block 319) to determine when the captured beverage container is removed from the beverage capture assembly 102. When the delivery door opens, the customer making the beverage selection simply needs to reach into the delivery access port 32 and lift the delivered beverage container forward and up out of the beverage capture assembly. Since the delivery access port 32 is located at a higher (approximately waist) level then most vending machine delivery vends, the customer does not have to unduly bend or contort his/her body in order to remove the selected beverage from the machine.

When the delivered beverage container has been removed from the delivery port, the product present sensor 222 will inform the Controller of that fact, and after a two-second delay (320) the Controller will energize the delivery door motor 123 so as to close the delivery door (321). Once the delivery door is closed, as indicated by activation of the door closed switch 130, the vend cycle is complete (322). Following a successful vend, vend housekeeping matters such as incrementing of the electronic cash counter and the vend counter, etc. will be performed as is well-known in the art.

It will be appreciated that the above process provides a smooth continuous vending sequence, all in view of the customer, to deliver the selected beverage container to the customer without jarring, dropping, or rolling of the container, or otherwise subjecting the container to sharp or severe impact forces. Upon removal of the container from the delivery port, the consumer can immediately open the container without concern for its contents exploding, or foaming out of the container, and without concern for damage being caused to fragile containers during the vending process. It will also be appreciated that since the delivery port is located in the side control panel, that area near the bottom of the machine that with prior art devices was used for delivery bins, can be used to advantage to store more product within the machine. It will also be appreciated that the apparatus and process allows for greater flexibility in arranging products of varied sizes, shapes, volumes and types of containers within the same machine and that the delivery door position is accommodating to the consumer. It will also be appreciated that implementation of the principles of the invention can be achieved in an economical manner since none of the product trays or shelves require any active and expensive components in order to effect a vend. These and other features and advantages of the invention will be readily apparent to those skilled in the art in view of the foregoing description.

It will be appreciated that while a preferred embodiment description and application of the invention have been disclosed other modifications of the invention not specifically disclosed or referred to herein will be apparent to those skilled in the art in light of the foregoing description. This description is intended to provide concrete examples of a preferred embodiment structure and application clearly disclosing the present invention and its operative principles. Accordingly, the invention is not limit to any particular embodiment or configuration or component parts thereof. All alternatives, modifications and variations of the present invention which fall within the spirit and broad scope of the appended claims are covered.

We claim:

1. A method for vending beverages packaged in sealed containers, comprising:

a. storing a plurality of packaged beverages in upright standing manner in selectable queues of containers of such beverages within a vending machine;

b. visually presenting said selectable queues of such beverage containers for viewing by a customer through a glass wall panel of the vending machine; wherein the customer can visually select a beverage container from one of said selectable queues;

c. aligning a robotic assembly in the machine in registration with a customer selected one of said beverage container queues;

d. transferring the visually selected beverage container from the selected container queue in said upright standing manner to the robotic assembly;

e. carrying the transferred beverage container to a delivery port of the vending machine; and f. presenting the carried beverage container at the delivery port for customer removal from the vending machine; wherein the entire process is performed without subjecting the container to severe impact forces and while maintaining the selected beverage container in said upright standing position.

2. The method of claim 1, including the step of arranging the beverage containers on shelves within the machine in ordered contained rows of said containers, said rows extending generally in a direction from front to back of the machine.

3. The method of claim 2, wherein the step of arranging said containers includes separating said rows of containers by shelf dividers extending generally in a direction from front to back of the machine.

4. The method of claim 2, including the step of inclining at least one of said beverage containing shelves at an inclined angle to the horizontal from front to back of the shelf; whereby containers carried by said shelf are urged by gravity toward the front of the shelf.

5. The method of claim 1, including the step of arranging a plurality of the beverage containers in contained alignment within a plurality of selectable identifiable trays within the vending machine, said trays having at least a portion thereof extending in the direction from front to back of the machine.

6. The method of claim 5, including the step of configuring said plurality of trays in generally vertical columns as viewed from the front of the machine.

7. The method of claim 6, including the step of selectably varying the vertical separation distance between adjacent said trays in a said column, to accommodate beverage containers of varied heights.

8. The method of claim 5, including the step of inclining at least one of said beverage trays at an inclined angle to the horizontal from front to back of the tray; whereby said containers carried by said tray are urged by gravity toward the front of the tray.

9. The method of claim 1, further including the step of advancing said plurality of beverage containers within at least one of said queues toward a dispensing end of said queue; wherein said robotic assembly is aligned in registration with said dispensing end of said queue; and wherein said one beverage container transferred from said selected queue is transferred from said dispensing end of said queue.

10. The method of claim 1, wherein the step of carrying includes moving said transferred beverage by said robotic assembly in a generally vertical X-Y plane of travel within said vending machine.

11. The method of claim 1, wherein the step of presenting the beverage container includes opening a delivery door at said delivery port to enable a customer to reach into and to remove the beverage container from the delivery port.

12. The method of claim 1, wherein the beverage container is presented for customer removal generally from thigh to waist height.

13. The method of claim 1, wherein the step of transferring one of the beverage containers from the selected container queue comprises sliding said one beverage container from said container queue into retaining engagement by the robotic assembly.

14. The method of claim 1, further including retaining a plurality of beverage containers in said queue by retainably preventing a first-in-line container from moving out of said queue.

15. The method of claim 14, wherein the step of transferring one of the beverage containers from the selected container queue includes releasing said first-in-line container for movement by gravity into said robotic assembly.

16. The method of claim 15, including retaining a second-in-line and successively aligned ones of said beverage containers in said selected queue from moving in said queue while said first-in-line container is moving into said robotic assembly.

17. The method of claim 14, wherein said retaining of the first-in-line and other beverage containers within said queue is performed by a passive restraint apparatus requiring no active power consuming components.

18. The method of claim 1, wherein the step of transferring said one beverage container is achieved through energy provided by said robotic assembly.

19. The method of claim 1, including the step of visually presenting said beverages of said selectable queues to a customer through a generally transparent viewing panel of the vending machine prior to customer selection of a beverage.

20. A method of vending bottled beverages from a vending machine of the type having a transparent front viewing panel that enables customer viewing of the actual beverages held by the machine and available for vending, comprising the steps of:

a. aligning a plurality of bottled beverages in at least two ordered queues of said beverages;

b. providing a customer selection input identifiable with at least one of said two ordered queues of beverages;

c. removing a bottled beverage from said one of said ordered queues by means of a robotic assembly, in response to said customer selection input; and d. smoothly moving said bottled beverage by said robotic assembly in a generally vertical X-Y plane within a vend selection space of the vending machine, to a delivery port of the machine; wherein said removing and moving steps are performed without dropping or subjecting the bottled beverage to sharp impact forces.

21. The method of claim 20, wherein the step of removing said bottled beverage comprises smoothly sliding said bottled beverage being removed from said one of said ordered queues into said robotic assembly.

22. The method of claim 21, wherein the step of removing said bottled beverage includes releasing an escapement mechanism associated with said one of said ordered queues for enabling the bottled beverage being removed to slide by gravity into said robotic assembly.

23. The method of claim 22, wherein the step of releasing an escapement mechanism comprises moving said robotic assembly so as to operatively engage a cam release assembly of the escapement mechanism.

24. A method vending bottled beverages from a vending machine of the type having a transparent front viewing panel that enables customer viewing of the actual beverages held by the machine and available for vending, comprising the steps of:

a. aligning a plurality of bottled beverages in at least two ordered queues of said beverages;

b. providing a customer selection input identifiable with at least one of said two ordered queues of beverages;

c. removing a bottled beverage from said one of said ordered queues in response to said customer selection input; and d. moving said removed bottled beverage to a delivery port of the machine positioned at a height of greater than 27 inches above the surface that supports the vending machine; wherein said removing and moving steps are smoothly performed without dropping or subjecting the bottled beverage to sharp impact forces.

25. A method of vending discrete products from a vending machine of the type having a transparent viewing panel for customer viewing and selection of the products to be vended, and support mean for supportably holding said products for visual presentation to a customer through said viewing panel; comprising the steps of:

a. ordering said products in a plurality of selectable queues of said products on said support means, said products being ordered in standing upright manner so as to be identifiably distinguishable from those of other queues and such that a foremost one of said products in each of said queues addresses the viewing panel at a dispensing end of its associated queue;

b. moving a capture assembly into alignment with the dispensing end of a customer selected one of said queues;

c. transferring the foremost one of said products, in said standing upright manner from said customer selected one of said queues into retainment by said capture assembly;

d. moving said capture assembly with its retained product in view of said viewing panel to a delivery port;

e. enabling customer removal of said retained product from said capture assembly at said delivery port; and f. wherein the steps of transferring and moving said foremost product from said selected queue to said delivery port are performed while retaining said product in said standing upright manner and without subjecting said foremost product to sharp impact forces.

26. The method of claim 25, wherein the step of transferring said foremost one of said products comprises the steps of:

a. moving said capture assembly to activate an escapement mechanism at the dispensing end of said customer selected one of said queues; and b. sliding said foremost one of said products past said escapement mechanism and into said capture assembly.

27. The method of claim 26, wherein the step of moving said capture assembly to engage said escapement mechanism comprises rotating said capture assembly about a generally horizontal pivot axis.

28. The method of claim 25, wherein the step of moving the capture assembly into alignment with the dispensing end of the customer selected queue includes moving and retaining the position of said capture assembly in the vertical direction into a vertical alignment accuracy of better or equal to $1/32$ inch.

29. The method of claim 28, wherein the step of moving the capture assembly into alignment comprises moving the capture assembly with at least one gear drive motor.

30. The method of claim 29, wherein said gear drive motor operatively engages a rack member.

31. The method of claim 25, wherein the step of moving said capture assembly into alignment with said selected queue comprises moving said capture assembly generally along X and Y coordinates of a generally vertical X-Y plane, and wherein said movement along said X and Y coordinates is performed by means of rack and pinion drive members.

32. The method of claim 25, wherein said products include products of different sizes.

33. The method of claim 25, wherein said products include products of different shapes.

34. The method of claim 25, wherein said products include products of different weights.

35. A vending machine for beverages packaged in sealed containers, comprising:

a. a storage facility defining an enclosed internal cavity and a container delivery port opening into said internal cavity;

b. a container holder within said internal cavity configured to hold in a queue a plurality of selectable sealed beverage containers in upright standing manner; said container holder being disposed so as to define with said storage facility a vend selection space within said internal cavity;

c. a beverage container capture system for retainably removing one of said plurality of selectable beverage containers from said container holder in response to a vend control signal;

d. a transporter operatively connected with said beverage container capture system for moving said beverage container capture system within said vend selection space in response to said vend control signal; and e. a controller operatively connected with said capture system and with said transporter for producing and providing said vend control signal thereto to cause said capture system and said transporter to cooperatively capture a selected beverage container from said container holding means and smoothly carry said captured container in said upright manner through said vend selection space to said delivery port without dropping or subjecting said selected beverage container to sharp impact forces.

36. The vending machine of claim 35, wherein said storage facility comprises: a chassis, and a door cooperatively mounted to said chassis for defining therewith said internal cavity.

37. The vending machine of claim 36, wherein said door includes a transparent panel for enabling customer viewing of said plurality of selectable beverage containers therethrough.

38. The vending machine of claim 37, wherein said door includes said container delivery port.

39. The vending machine of claim 38, wherein said container delivery port is located to one side of said transparent panel.

40. The vending machine of claim 35, further including refrigeration means operatively connected with said storage facility to cool at least a portion of said internal cavity.

41. The vending machine of claim 35, wherein said container holding means includes shelf means operatively mounted within said internal cavity for maintaining said beverage containers in a plurality of selectable queues of said containers.

42. The vending machine of claim 41, wherein said container delivery port is remotely located from said plurality of queues.

43. The vending machine of claim 41, wherein said shelf means is configured to arrange said container queues such that a discharge end of said queues is positioned adjacent said vend selection space.

44. The vending machine of claim 43, further including container release means operatively connected with at least one of said queues adjacent said discharge end thereof for selectably retaining said beverage containers in said one queue.

45. The vending machine of claim 44, wherein said container release means comprises only passive components.

46. The vending machine of claim 44, wherein said beverage container capture means includes means cooperatively engagable with said container release means of said one queue for activating said container release means when removing a container from said container holding means.

47. The vending machine of claim 46, wherein said container release means includes a cam assembly, and wherein said capture means cooperatively engages said cam assembly.

48. The vending machine of claim 41, wherein said shelf means include means for maintaining said beverage containers in said queues at an angle inclined with respect to the horizontal.

49. The vending machine of claim 48, wherein said angle is from about 8 degrees to 20 degrees with the horizontal.

50. The vending machine of claim 49, wherein the angle is from about 10 degrees to 15 degrees with the horizontal.

51. The vending machine of claim 48, wherein said shelf means includes means for adjusting said angle.

52. The vending machine of claim 51, wherein said shelf means includes means for selectively adjusting the angles of individual ones of said queues.

53. The vending machine of claim 41, wherein said shelf means includes a plurality of container trays having discharge ends positioned adjacent said vend selection space.

54. The vending machine of claim 53, further including mounting means for mounting said plurality of trays in generally vertical columns.

55. The vending machine of claim 53, wherein said trays further include container release means operatively connected with at least one of said trays adjacent said discharge end thereof for selectively retaining said beverage containers in a queue within said one tray.

56. The vending machine of claim 55, wherein said container release means comprises only passive components.

57. The vending machine of claim 35, including release means cooperatively connected with said container holding means and activatable by said beverage container capture means for releasing by gravity a selected container from said container holding means to said beverage container capture means.

58. The vending machine of claim 35, wherein said transport means comprises rack and pinion means for operatively moving said beverage container capture means in said vend selection space relative to said container holding means.

59. The vending machine of claim 58, wherein said rack and pinion means includes at least one gear track and at least one dc motor having an output gear for cooperatively engaging said gear rack, and wherein said dc motor is operatively connected for energization by said vend control signal.

60. The vending machine of claim 35, wherein said transport means includes an X-Y drive apparatus for accurately moving said capture container means in two orthogonal directions within said vend selection space.

61. The vending machine of claim 35, further including detection means operatively connected with said beverage container capture means for detecting the presence or absence of a said container within said beverage container capture means.

62. The vending machine of claim 35, wherein said control means includes input selection means for receiving customer input stimuli and for producing said vend control signal in response thereto.

63. A vending machine for vending selectable products comprising:

a. a product storage chassis including a door, cooperatively forming an internal cavity; said chassis including a transparent wall panel portion for enabling viewing therethrough into said internal cavity and a product delivery port spaced from said transparent wall panel portion;

b. a product selector operable by a customer for generating a vend control signal indicative of a product selection of the customer;

c. a support operatively mounted within said internal cavity of the product storage chassis configured to support said products in a plurality of selectable and separate ordered queues of such products, said products being supported in standing upright manner by said support; and d. a robotic assembly mounted to said chassis and operatively movable within said internal cavity in response to said vend control signal to rapidly and smoothly remove and carry a selected said product from its associated said ordered queue to said product delivery port without dropping or jarring the selected product, and all while maintaining orientation of said product in said standing upright manner; wherein a customer can visually inspect said products before selection and can view the entire product removal and carrying operations of a vending cycle of the machine through said transparent panel portion.

64. The vending machine of claim 63, wherein said product delivery port is located generally at about thigh or waist level.

65. The vending machine of claim 64, wherein said delivery port is located at a height of greater or equal to 27 inches from a support surface on which the vending machine rests.

66. The vending machine of claim 63, wherein said product delivery port includes a door and means cooperatively connected with said door for enabling opening of said door only when said selected product is present for removal at said delivery port.

67. The vending machine of claim 66, further including a power operator operatively connected with said door for moving said door in opening and closing manner relative to said delivery port.

68. The vending machine of claim 67, wherein said power operator includes a rack and pinion opening and closing apparatus.

69. The vending machine of claim 63, further including: (a.) a door operatively positioned to selectively open and close said delivery access port to access therethrough; and (b.) a lock operatively connected with said robotic assembly adjacent said product delivery port for locking said robotic assembly against movement whenever said door is open.

70. The vending machine of claim 63, further including:

a. a door movable to open and close said product delivery port;

b. means cooperatively connected with said door for enabling opening of said door only when said selected product is present for removal at said product delivery port; and c. a lock separately connected with said robotic assembly for locking said robotic assembly against movement whenever said door is enabled for opening.

71. The vending machine of claim 63, wherein said robotic assembly comprises:

a. an X-Y support frame mounted in said chassis and at one end of said support means;

b. a shuttle, movably mounted to said X-Y support frame for controlled rapid uniform movement therealong in an X direction;

c. a carriage assembly operatively connected to said shuttle for controlled movement therealong in a Y direction;

d. a capture mechanism operatively mounted to said carriage assembly for removing and carrying said selected product from its associated ordered queue.

72. The vending machine of claim 71, wherein said shuttle is mounted to said X-Y support frame by a rack and pinion assembly.

73. The vending machine of claim 72, wherein said rack and pinion assembly includes:

a. a pair of spaced generally horizontal racks forming a part of said X-Y support frame, said horizontal racks being positioned adjacent upper and lower portions of said internal cavity;

b. a pair of spur gears cooperatively mounted to said shuttle for simultaneous movement and respectively operatively engaging said pair of spaced racks; and c. an X-drive motor mounted to said shuttle and having an output gear operatively engaging one of said spur gears; wherein said X-drive motor moves said shuttle in the X-direction along said horizontal racks.

74. The vending machine of claim 73, wherein said X-drive motor is a reversible dc motor.

75. The vending machine of claim 72, wherein said carriage assembly is operatively connected to said shuttle by a rack and pinion assembly.

76. The vending machine of claim 71, wherein said carriage assembly is operatively connected to said shuttle by a rack and pinion assembly.

77. The vending machine of claim 76, wherein said rack and pinion assembly includes:

a. a generally vertical rack mounted to said shuttle;

b. a slide assembly slidably connecting said carriage assembly to said shuttle, for movement in said Y-direction;

c. a drive gear cooperatively engaging said vertical rack; and d. a Y-drive motor mounted to said carriage assembly and operatively connected to move said drive gear; wherein said Y-drive motor moves said carriage in the Y-direction along said vertical rack and slide assembly.

78. The vending machine of claim 77, wherein said Y-drive motor is a reversible dc motor.

79. The vending machine of claim 78, further including power means for energizing said Y-drive motor with a pulse-width-modulated signal in response to said vend control signal.

80. The vending machine of claim 71, wherein said capture mechanism includes Z-drive means for moving at least a portion of said capture mechanism in a Z-direction, orthogonal to a plane defined by said X and said Y directions.

81. The vending machine of claim 80, wherein said support means includes at least one release assembly operatively aligned with at least one of said ordered queues of products for selectively releasing said products from said one queue one at a time in consecutive ordered manner; and wherein said capture mechanism activates said release assembly when said capture mechanism moves in said Z-direction.

82. The vending machine of claim 81, wherein said one release assembly comprises all passive components.

83. The vending machine of claim 63, wherein said support means is configured to support said products of differing shapes within said queues; and wherein said robotic assembly is operable to remove and carry said selected products of differing shapes.

84. The vending machine of claim 63, wherein said support means is configured to support said products of differing sizes within said queues; and wherein said robotic assembly is operable to remove and carry said selected products of differing sizes.

85. The vending machine of claim 63, wherein said support means supports at least one of said plurality of ordered queues of said products at an inclined angle to the horizontal.

86. The vending machine of claim 85, wherein said robotic assembly is operable to remove said selected products from said at least one inclined queue by sliding said selected products with the help of gravity into said robotic assembly.

87. The vending machine of claim 85, wherein said support means includes a low friction floor portion in said at least one of said queues disposed at an inclined angle for supporting said products within that queue.

88. A carriage assembly for use with a vending machine of the type having: a chassis defining an internal cavity, a front door forming one side of said chassis; a product support assembly mounted in said chassis and configured to hold a plurality of products to be vended in separate ordered queues of said products, such that one end of said queues address a dispensing end of said product support assembly, wherein the volume between said dispensing ends of said product support assembly and said door defines a vend selection space; said carriage assembly comprising:

a. an X-rail assembly mounted to said chassis in generally horizontal orientation;

b. a Y-rail assembly mounted to said X-rail assembly in generally vertical orientation and configured for movement along said X-rail assembly;

c. an X-drive motor mounted for movement with said Y-rail assembly for controlling movement of said Y-rail assembly along said X-rail assembly;

d. a carriage mounted to said Y-rail assembly for movement therealong;

e. a Y-drive motor mounted for movement with said carriage for controlling movement of said carriage along said Y-rail assembly; and f. said carriage assembly being configured to accurately move, position and hold said carriage relative to said product support assembly within said vend selection space.

89. The carriage assembly of claim 88, wherein said X-rail assembly includes upper and lower spaced rails, and wherein said Y-rail assembly has opposed ends that are operatively mounted between said upper and lower spaced rails for movement therealong.

90. The carriage assembly of claim 89, wherein said upper and lower rails comprise elongate gear racks, and wherein said X-drive motor comprises a motor with an output gear drive for cooperatively engaging at least a first of said spaced rails.

91. The carriage assembly of claim 90, further including a gear extension operatively connected with said X-drive motor output gear drive and with a second of said spaced rails such that energization of said X-drive output gear drive simultaneously positively moves the opposed ends of said Y-rail assembly along said spaced rails.

92. The carriage assembly of claim 88, wherein said X-drive motor is a dc motor.

93. The carriage assembly of claim 88, wherein said Y-rail assembly includes an elongate gear rack extending therealong, and wherein said Y-drive motor comprises a motor with an output drive gear mounted to cooperatively engage said elongate gear rack of said Y-rail assembly.

94. The carriage assembly of claim 93, further including a slide assembly cooperatively connecting said carriage to said Y-rail assembly for guiding said carriage along said Y-rail assembly and for preventing pivotal motion of said carriage about a vertical axis.

95. The carriage assembly of claim 93, wherein said Y-drive motor is a dc motor, and further including power control means connected with said Y-drive motor for providing a pulse-width-modulated drive signal to said Y-drive motor.

96. The carriage assembly of claim 95, wherein said carriage can attain movement positioning and positional maintenance of said carriage along said Y-rail assembly to within an accuracy of 1/32 inch.

97. The carriage assembly of claim 95, wherein said carriage can attain movement positioning and positional maintenance of said carriage along said Y-rail assembly to within an accuracy of 1/64 inch.

98. The carriage assembly of claim 93, including a Y-position location sensor for accurately locating the vertical position of said carriage.

99. The carriage assembly of claim 98, wherein said Y-position location sensor comprises an optical encoder operatively connected with said Y-drive motor.

100. The carriage assembly of claim 88, wherein said X-rail assembly includes an X-position location sensor for accurately determining the position of the Y-rail assembly relative to said X-rail assembly.

101. The carriage assembly of claim 88, including control means for providing coordinated drive signals to said X-drive and said Y-drive motors for simultaneously moving said Y-rail assembly and said carriage to a desired X-Y location within said vend selection space.

102. A product release and capture assembly for use in a vending machine of the type having: a chassis defining an internal cavity; a product support assembly mounted in said chassis and configured to hold a plurality of products to be vended in separate ordered queues of said products; said product support assembly being arranged and configured to define a dispensing end of said queues, wherein a vend selection space is defined in said internal cavity adjacent said dispensing ends of said queues; said product support assembly further including means for urging products in said queues to move toward the dispensing ends of said queues; a carriage; drive means connected to controllably move said carriage generally in an X-Y coordinate plane within said vend selection space into alignment with the dispensing end of a selected one of said product queues; said product release and capture assembly comprising:

a. an escapement mechanism mounted to said product support assembly of said selected one of said product queues adjacent the dispensing end thereof; said escapement mechanism comprising:

i. a first engagement member configured to selectively engage a first-in-line product at the dispensing end of said selected queue;

ii. a second engagement member configured to selectively engage a second-in-line product aligned in said queue immediately adjacent to and behind said first-in-line product;

iii. a connector operatively connecting said first and said second engagement members for cooperative movement; said connector being configured to move said first engagement member into engaging and disengaging positions relative to said first-in-line product while simultaneously respectively moving said second engagement member into disengaging and engaging positions relative to said second-inline product;

iv. bias means operatively connected with said connector for normally moving said first engagement member into its said engaging position; and v. a force receiving surface operatively connected with said connector for receiving an activating force tending to move said connector against the normal bias of said bias means; and b. a capture receptacle, movably mounted to said carriage, for movement between first and second positions; said capture receptacle when operable in said first position enabling free movement of said capture receptacle and said carriage relative to said escapement mechanism in said vend space; and being operable when moving to said second position, and when said carriage is positioned in operative alignment with the dispensing end of the selected queue, to engage said force receiving surface to operatively move said connector against the bias of said bias means, to move said first engagement member toward its disengaging position, thereby releasing said first-in-line product for movement out of the dispensing end of the queue and into said capture receptacle.

103. The product release and capture assembly of claim 102, wherein said force receiving surface comprises a cam surface.

104. The product release and capture assembly of claim 103, wherein said cam surface projects beyond the dispensing end of said product support assembly and at an angle relative to the general plane of said vend selection space.

105. The product release and capture assembly of claim 102, wherein said connector is pivotally mounted to said product support assembly to one side of said selected queue of products and about a first upright axis extending generally perpendicular to a dispensing direction in which said products move in said queue.

106. The product release and capture assembly of claim 105, wherein said connector slidably engages said first engagement member.

107. The product release and capture assembly of claim 106, wherein said first engagement member is pivotally mounted to said product support assembly to one side of said selected queue of products and about a second upright axis spaced in the dispensing direction from the first upright axis and extending generally perpendicular to the dispensing direction.

108. The product release and capture assembly of claim 107, wherein said connector defines a slot therethrough; wherein said first engagement member extends through said slot; and wherein an edge of said slot slidably engages said first engagement member to pivot said first engagement member about said second axis.

109. The product release and capture assembly of claim 108, wherein said first engagement member includes an arm portion extending from said second pivot axis toward a distal end, and a product engaging stop member connected at said distal end.

110. The product release and capture assembly of claim 109, wherein said arm portion of said first engagement member extends through said connector slot; and wherein said connector and said first engagement member are cooperatively operable such that when said first engagement member is disposed in its engaged position, said arm portion of said first engagement member lies generally perpendicular to the dispensing direction, placing said product engaging stop member in the path of said first-in-line product of said queue; and when said first engagement member is disposed in its disengaged position, said arm portion thereof lies generally parallel to said dispensing direction, with said product engaging stop member being positioned to one side of the first-in-line product as it advances in the dispensing direction.

111. The product release and capture assembly of claim 106, wherein the forces applied by said connector to said first engagement member exceed the combined forces of the aligned products of said selected queue tending to move said products down the queue in the dispensing direction.

112. The product release and capture assembly of claim 106, wherein said connector includes a rear pivot arm portion extending from said first pivot axis back toward said second engagement member, and a forward pivot arm portion extending from said first pivot axis toward said dispensing end and said force receiving surface.

113. The product release and capture assembly of claim 112, wherein said rear and said forward pivot arm portions of said connector define an obtuse angle about said first pivot axis.

114. The product release and capture assembly of claim 105, wherein said escapement mechanism further includes a generally vertical wall member for retaining one side of said products within said selected queue, and wherein said connector is pivotally mounted to said wall member.

115. The product release and capture assembly of claim 107, wherein said escapement mechanism further includes a generally vertical wall member of retaining one side of said products within said selected queue, and wherein said connector and said first engagement members are mounted about said first and said second pivot axes respectively to said wall.

116. The product release and capture assembly of claim 102, wherein said bias means is a spring.

117. The product release and capture assembly of claim 102, wherein said escapement mechanism includes only passive components requiring no power energy sources.

118. The product release and capture assembly of claim 102, wherein said capture receptacle is pivotally mounted to said carriage about a generally horizontal pivot axis, generally perpendicular to a dispensing direction in which said products move in the queue; wherein said capture receptacle slidably engages said force receiving surface as it moves to its said second position.

119. The product release and capture assembly of claim 102, further including a drive motor operatively connecting said carriage and said capture receptacle for moving said capture receptacle between its said first and said second positions.

120. The product release and capture assembly of claim 119, wherein said drive motor is mounted to said capture receptacle.

121. The product release and capture assembly of claim 102, wherein said capture receptacle includes a floor portion configured to retainably support at least one of said products of said selected queue, said capture receptacle being configured such that said floor portion thereof aligns with a floor portion of said selected queue when said capture receptacle is positioned in its said second position; wherein said first-in-line product of said selected queue can smoothly slide from the dispensing end of said selected queue onto side floor portion of said capture receptacle.

122. The product release and capture assembly of claim 121, wherein said floor portion of said capture receptacle includes a detent area for retainably holding a bottom edge of said product once said product slides into said capture receptacle.

123. The product release and capture assembly of claim 121, wherein said floor portion of said capture receptacle comprises low-friction material.

124. The product release and capture assembly of claim 121, wherein said floor portion of said capture receptacle comprises a ribbed configuration for reducing sliding friction.

125. The product release and capture assembly of claim 121, wherein the upper surface of said floor portion of said capture receptacle defines a first floor plane, and wherein the upper surface of the product support assembly portion defining the selected queue defines a second floor plane; and wherein said first and said second floor planes are generally aligned coplanar when said capture receptacle is disposed in its said second position.

126. The product release and capture assembly of claim 102, wherein said capture receptacle includes at least one upper product retainer member for stabilizing an upper portion of said first-in-line product received by said capture receptacle.

127. The product release and capture assembly of claim 102, wherein said capture receptacle includes a sensor for detecting the presence or absence of said product in said capture receptacle.

128. The product release and capture assembly of claim 102, wherein said capture receptacle, is generally characterized by an open first end that addresses said selected queue for receiving in unobstructing manner said first-in-line product from said queue, and a second end, opposite to said first end, having an access port sized sufficiently large to enable the product retained by said capture receptacle to be lifted and removed from said capture assembly through said access port.

129. A method for vending beverages packaged in sealed containers, comprising:

a. storing a plurality of packaged beverages in selectable queues of containers of such beverages within a vending machine;

b. aligning a robotic assembly in the machine in registration with a customer selected one of said beverage container queues;

c. transferring one of the beverage containers from the selected container queue to the robotic assembly;

d. carrying the transferred beverage container by said robotic assembly in a generally vertical X-Y plane of travel within said vending machine, to a delivery port of the vending machine; and e. presenting the carried beverage container at the delivery port for customer removal from the vending machine; wherein the entire process is performed without dropping or subjecting the container to severe impact forces.

130. A method for vending beverages packaged in sealed containers, comprising:

a. storing a plurality of packaged beverages in selectable queues of containers of such beverages in a vending machine;

b. retaining a plurality of said beverage containers in said selectable queues by retainably preventing a first-in-line container from moving out of said queue;

c. aligning a robotic assembly in the machine in registration with a customer selected one of said beverage container queues;

d. transferring one of the beverage containers from the selected container queue to the robotic assembly;

e. carrying the transferred beverage container to a delivery port of the vending machine; and f. presenting the carried beverage container at the delivery port for customer removal from the vending machine; wherein the entire process is performed without dropping or subjecting the container to severe impact forces.

131. The method of claim 130, wherein the step of transferring one of the beverage containers from the selected container queue includes releasing said first-in-line container for movement by gravity into said robotic assembly.

132. The method of claim 131, including retaining a second-in-line and successively aligned ones of said beverage containers in said selected queue from moving in said queue while said first-in-line container is moving into said robotic assembly.

133. The method of claim 132, wherein said retaining of the first-in-line and other beverage containers within said queue is performed by a passive restraint apparatus requiring no active power consuming components.

134. A method of vending bottled beverages from a vending machine of the type having a transparent front viewing panel that enables customer viewing of the actual beverages held by the machine and available for vending, comprising the steps of:

a. aligning a plurality of bottled beverages in at least two ordered queues of said beverages;

b. providing a customer selection input identifiable with at least one of said two ordered queues of beverages;

c. smoothly removing a bottled beverage from said one of said ordered queues by means of a robotic assembly in a generally vertical X-Y plane within a vend selection space of the vending machine in response to said customer selection input; and d. moving said removed bottled beverage to a delivery port of the machine; wherein said removing and moving steps are smoothly performed without dropping or subjecting the bottled beverage to sharp impact forces.

135. A method of vending bottled beverages from a vending machine of the type having a transparent front viewing panel that enables customer viewing of the actual beverages held by the machine and available for vending, comprising the steps of:

a. aligning a plurality of bottled beverages in at least two ordered queues of said beverages;

b. providing a customer selection input identifiable with at least one of said two ordered queues of beverages;

c. removing a bottled beverage from said one of said ordered queues comprising:

(i) moving a robotic assembly so as to engage and release an escapement cam mechanism associated with said queue to enable the bottled beverage being removed to slide by gravity along said queue, and (ii)

d. moving said removed bottled beverage to a delivery port of the machine; wherein said removing and moving steps are smoothly performed without dropping or subjecting the bottled beverage to sharp impact forces.

136. A method of vending discrete products from a vending machine of the type having a transparent viewing panel for customer viewing and selection of the products to be vended, and support means for supportably holding said products for visual presentation to a customer through said viewing panel; comprising the steps of:

a. ordering said products in a plurality of selectable queues of said products on said support means such that a foremost one of said products in each of said queues addresses the viewing panel at a dispensing end of its associated queue;

b. moving a capture assembly into alignment with the dispensing end of a customer selected one of said queues;

c. transferring the foremost one of said products from said customer selected one of said queues into retainment by said capture assembly by (i) moving said capture assembly to activate an escapement mechanism at the dispensing end of the customer selected one of said queues; and (ii) sliding said foremost one of said products past said escapement mechanism and into said capture assembly;

d. moving said capture assembly with its retained product in view of said viewing panel to a delivery port;

e. enabling customer removal of said retained product from said capture assembly at said delivery port; and f. wherein the steps of transferring and moving said foremost product from said selected queue to said delivery port are performed without dropping or subjecting said foremost product to sharp impact forces.

137. The method of claim 136, wherein the step of moving said capture assembly to engage said escapement mechanism comprises rotating said capture assembly about a generally horizontal pivot axis.

138. A method of vending discrete products from a vending machine of the type having a transparent viewing panel for customer viewing and selection of the products to be vended, and support means for supportably holding said products for visual presentation to a customer through said viewing panel; comprising the steps of:

a. ordering said products in a plurality of selectable queues of said products on said support means such that a foremost one of said products in each of said queues addresses the viewing panel at a dispensing end of its associated queue;

b. moving a capture assembly into alignment with the dispensing end of a customer selected one of said queues within a vertical alignment accuracy of better or equal to 1/32 inch;

c. transferring the foremost one of said products from said customer selected one of said queues into retainment by said capture assembly;

d. moving said capture assembly with its retained product in view of said viewing panel to a delivery port;

e. enabling customer removal of said retained product from said capture assembly at said delivery port; and f. wherein the steps of transferring and moving said foremost product from said selected queue to said delivery port are performed without dropping or subjecting said foremost product to sharp impact forces.

139. The method of claim 138, wherein the step of moving the capture assembly into alignment comprises moving the capture assembly with at least one gear drive motor.

140. The method of claim 139, wherein said gear drive motor operatively engages a rack member.

141. A method of vending discrete products from a vending machine of the type having a transparent viewing panel for customer viewing and selection of the products to be vended, and support means for supportably holding said products for visual presentation to a customer through said viewing panel; comprising the steps of:

a. ordering said products in a plurality of selectable queues of said products on said support means such that a foremost one of said products in each of said queues addresses the viewing panel at a dispensing end of its associated queue;

b. moving a capture assembly generally along X and Y coordinates of a generally vertical X-Y plane by rack and pinion drive members, into alignment with the dispensing end of a customer selected one of said queues;

c. transferring the foremost one of said products from said customer selected one of said queues into retainment by said capture assembly;

d. moving said capture assembly with its retained product in view of said viewing panel to a delivery port;

e. enabling customer removal of said retained product from said capture assembly at said delivery port; and f. wherein the steps of transferring and moving said foremost product from said selected queue to said delivery port are performed without dropping or subjecting said foremost product to sharp impact forces.

142. A vending machine for beverages packaged in sealed containers, comprising:

a. a storage facility defining an enclosed internal cavity and a container delivery port opening into said internal cavity;

b. a container holder within said internal cavity for holding a plurality of selectable sealed beverage containers; said container holder being disposed so as to define with said storage facility a vend selection space within said internal cavity;

c. a shelf operatively mounted within said internal cavity for maintaining said beverage containers in a plurality of selectable queues such that a discharge end of said queues is positioned adjacent said vend selection space;

d. a beverage container capture system for retainably removing one of said plurality of selectable beverage containers from said container holder in response to a vend control signal;

e. a container release operatively connected with at least one of said queues adjacent said discharge end thereof for selectably retaining said beverage containers in said one queue; said container release including a cam assembly constructed and arranged to cooperatively engage with said capture system; said beverage container capture system being cooperatively engagable with said container release of said one queue for activating said container release when removing a container from said container holder;

f. a transporter operatively connected with said beverage container capture system for moving said beverage container capture system within said vend selection space in response to said vend control signal; and g. a controller operatively connected with said capture system and with said transporter for producing and providing said vend control signal thereto to cause said capture system and said transporter to cooperatively capture a selected beverage container from said container holder and smoothly carry said captured container through said vend selection space to said delivery port without dropping or subjecting said selected beverage container to sharp impact forces.

143. A vending machine for beverages packaged in sealed containers, comprising:

a. a storage facility defining an enclosed internal cavity and a container delivery port opening into said internal cavity;

b. a container holder within said internal cavity for holding a plurality of selectable sealed beverage containers; said container holder being disposed so as to define with said storage facility a vend selection space within said internal cavity;

c. a beverage container capture system for retainably removing one of said plurality of selectable beverage containers from said container holder in response to a vend control signal;

d. a transporter operatively connected with said beverage container capture system for moving said beverage container capture system within said vend selection space in response to said vend control signal; said transporter comprising a rack and pinion system for operatively moving said beverage container capture system in said vend selection space relative to said container holder; and e. a controller operatively connected with said capture system and with said transporter for producing and providing said vend control signal thereto to cause said capture system and said transporter to cooperatively capture a selected beverage container from said container holder and smoothly carry said captured container through said vend selection space to said delivery port without dropping or subjecting said selected beverage container to sharp impact forces.

144. The vending machine of claim 143, wherein said rack and pinion system includes at least one gear track and at least one dc motor having an output gear for cooperatively engaging said gear rack, and wherein said dc motor is operatively connected for energization by said vend control signal.

145. A vending machine for beverages packaged in sealed containers, comprising:

a. a storage facility defining an enclosed internal cavity and a container delivery port opening into said internal cavity;

b. a container holder within said internal cavity for holding a plurality of selectable sealed beverage containers; said container holder being disposed so as to define with said storage facility a vend selection space within said internal cavity;

c. a beverage container capture system for retainably removing one of said plurality of selectable beverage containers from said container holder in response to a vend control signal;

d. a transporter operatively connected with said beverage container capture system for moving said beverage container capture system within said vend selection space in response to said vend control signal; said transporter having an X-Y drive apparatus for accurately moving said capture system in two orthogonal directions within said vend selection space; and e. a controller operatively connected with said capture system and with said transporter for producing and providing said vend control signal thereto to cause said capture system and said transporter to cooperatively capture a selected beverage container from said container holder and smoothly carry said captured container through said vend selection space to said delivery port without dropping or subjecting said selected beverage container to sharp impact forces.

146. A vending machine for vending selectable products comprising:

a. a product storage chassis including a door, cooperatively forming an internal cavity; said chassis including a transparent panel portion for enabling viewing therethrough into said internal cavity and a product delivery port spaced from said transparent panel portion; said product delivery port including a door and a power operator operatively connected with said door for opening and closing of said door relative to said delivery port, said power operator including a rack and pinion opening and closing apparatus;

b. a product selector operable by a customer for generating a vend control signal indicative of a product selection of the customer;

c. a support operatively mounted within said internal cavity of the product storage chassis for supporting said products in a plurality of selectable and separate ordered queues of such products; and d. a robotic assembly mounted to said chassis and operatively movable within said internal cavity in response to said vend control signal to rapidly and smoothly remove and carry a selected product from its associated ordered queue to said product delivery port without dropping or jarring the selected product; wherein a customer can view the entire product removal and carrying operations of a vending cycle of the machine through said transparent panel portion.

147. A vending machine for vending selectable products comprising:

a. a product storage chassis including a door, cooperatively forming an internal cavity; said chassis including a transparent panel portion for enabling viewing therethrough into said internal cavity and a product delivery port spaced from said transparent panel portion;

b. a product selector operable by a customer for generating a vend control signal indicative of a product selection of the customer;

c. a support operatively mounted within said internal cavity of the product storage chassis for supporting said products in a plurality of selectable and separate ordered queues of such products; and d. a robotic assembly mounted to said chassis and operatively movable within said internal cavity in response to said vend control signal to rapidly and smoothly remove and carry a selected product from its associated ordered queue to said product delivery port without dropping or jarring the selected product; said robotic assembly comprising:

(i) an X-Y support frame mounted in said chassis and at one end of said support;

(ii) a shuttle, movably mounted to said X-Y support frame for controlled rapid uniform movement therealong in an X direction;

(iii) a carriage assembly operatively connected to said shuttle for controlled movement therealong in a Y direction;

(iv) a capture mechanism operatively mounted to said carriage assembly for removing and carrying said selected product from its associated ordered queue;

wherein a customer can view the entire product removal and carrying operations of a vending cycle of the machine through said transparent panel portion.

148. The vending machine of claim 147, wherein said shuttle is mounted to said X-Y support frame by a rack and pinion assembly.

149. The vending machine of claim 148, wherein said rack and pinion assembly includes:

a. a pair of spaced generally horizontal racks forming a part of said X-Y support frame, said horizontal racks being positioned adjacent upper and lower portions of said internal cavity;

b. a pair of spur gears cooperatively mounted to said shuttle for simultaneous movement and respectively operatively engaging said pair of spaced racks; and c. an X-drive motor mounted to said shuttle and having an output gear operatively engaging one of said spur gears; wherein said X-drive motor moves said shuttle in the X-direction along said horizontal racks.

150. The vending machine of claim 148, wherein said X-drive motor is a reversible dc motor.

151. The vending machine of claim 148, wherein said carriage assembly is operatively connected to said shuttle by a rack and pinion assembly.

152. The vending machine of claim 142, wherein said carriage assembly is operatively connected to said shuttle by a rack and pinion assembly.

153. The vending machine of claim 152, wherein said rack and pinion assembly includes:

a. a generally vertical rack mounted to said shuttle;

b. a slide assembly slidably connecting said carriage assembly to said shuttle, for movement in said Y-direction;

c. a drive gear cooperatively engaging said vertical rack; and d. a Y-drive motor mounted to said carriage assembly and operatively connected to move said drive gear; wherein said Y-drive motor moves said carriage in the Y-direction along said vertical rack and slide assembly.

154. The vending machine of claim 153, wherein said Y-drive motor is a reversible dc motor.

155. The vending machine of claim 154, further including a power system for energizing said Y-drive motor with a pulse-width-modulated signal in response to said vend control signal.

156. The vending machine of claim 142, wherein said capture mechanism of said robotic assembly includes a Z-drive for moving at least a portion of said capture mechanism in a Z-direction, orthogonal to a plane defined by said X and said Y directions.

157. The vending machine of claim 156, wherein said support includes at least one release assembly operatively aligned with at least one of said ordered queues of products for selectively releasing said products from said one queue one at a time in consecutive ordered manner; and wherein said capture mechanism activates said release assembly when said capture mechanism moves in said Z-direction.

158. The vending machine of claim 157, wherein said release assembly comprises all passive components.

159. A vending machine for vending selectable products comprising:

a. a product storage chassis including a door, cooperatively forming an internal cavity; said chassis including a transparent panel portion for enabling viewing therethrough into said internal cavity and a product delivery port spaced from said transparent panel portion;

b. a product selector operable by a customer for generating a vend control signal indicative of a product selection of the customer;

c. a support operatively mounted within said internal cavity of the product storage chassis for supporting said products in a plurality of selectable and separate ordered queues of such products at an inclined angle to the horizontal; wherein said support includes a low friction floor portion in said at least one of said queues; and d. a robotic assembly mounted to said chassis and operatively movable within said internal cavity in response to said vend control signal to rapidly and smoothly remove and carry a selected said product from its associated said ordered queue to said product delivery port without dropping or jarring the selected product; wherein a customer can view the entire product removal and carrying operations of a vending cycle of the machine through said transparent panel portion.

* * * * *

US006230930C1

(12) EX PARTE REEXAMINATION CERTIFICATE (10255th)

United States Patent

Sorensen et al.

(10) Number: US 6,230,930 C1

(45) Certificate Issued: Aug. 12, 2014

(54) APPARATUS AND METHOD FOR VENDING PRODUCTS

(75) Inventors: Steven W. Sorensen, Maplewood, MN (US); James E. Skavnak, Minneapolis, MN (US); Thomas F. Gotich, Eagan, MN (US); Scott Hudis, Stillwater, MN (US); Joseph A. Lotspeich, West St. Paul, MN (US)

(73) Assignee: Crane Merchandising Systems, Inc., Bridgeton, MO (US)

Reexamination Request:

No. 90/010,114, Feb. 29, 2008

No. 90/009,374, Jan. 14, 2009

Reexamination Certificate for:

| | |
|---|---|
| Patent No.: | **6,230,930** |
| Issued: | **May 15, 2001** |
| Appl. No.: | **08/949,366** |
| Filed: | **Oct. 14, 1997** |

(51) Int. Cl.

*B65G 59/00* (2006.01)

(52) U.S. Cl.

USPC .......................................... 221/131; 221/289

(58) Field of Classification Search

None

See application file for complete search history.

(56) References Cited

To view the complete listing of prior art documents cited during the proceedings for Reexamination Control Numbers 90/010,114 and 90/009,374, please refer to the USPTO's public Patent Application Information Retrieval (PAIR) system under the Display References tab.

*Primary Examiner* — Jeffrey R Jastrzab

(57) ABSTRACT

An improved method and apparatus for vending products, and particularly beverage containers, of varied sizes, shapes and configurations without dropping or subjecting the vended product to damaging impact forces are disclosed. The products to be vended are aligned in selectable ordered queues within a vending machine that can include a transparent front panel. A robotic carriage assembly using rack and pinion assemblies moves in positive non-vibratory manner along an X-Y plane in the machine, captures the selected product from its queue and smoothly transports the product to a product delivery port conveniently located close to hip level. The carriage assembly uses unique product escapement and capture mechanisms to smoothly slide the related product from its queue into the carriage. Power door and safety lock features at the delivery port are also disclosed.

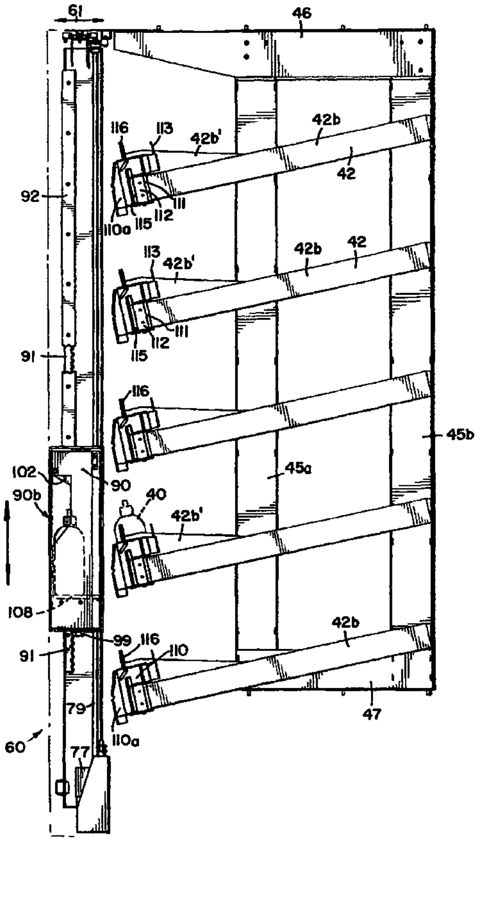

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-22, 24-26, 28-46, 48-50, 53-56, 58-67, 71, 72, 83-85, 87, 129, 130, 134, 136, 138-141, 143-145, 147 and 159 are cancelled.

Claims 23, 27, 47, 51, 52, 57, 68-70, 73-82, 86, 88-128, 131-133, 135, 137, 142, 146 and 148-158 were not reexamined.

* * * * *